(12) United States Patent
Ikeda et al.

(10) Patent No.: US 10,981,364 B2
(45) Date of Patent: Apr. 20, 2021

(54) DECORATED SHEET

(71) Applicant: TOPPAN PRINTING CO., LTD., Tokyo (JP)

(72) Inventors: Hisashi Ikeda, Tokyo (JP); Tatsuhiko Furuta, Tokyo (JP); Shinichi Miyamoto, Tokyo (JP); Masamitsu Nagahama, Noda (JP); Akira Sato, Noda (JP); Masatoshi Takahashi, Noda (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/525,865

(22) PCT Filed: Nov. 11, 2015

(86) PCT No.: PCT/JP2015/081745
§ 371 (c)(1),
(2) Date: May 10, 2017

(87) PCT Pub. No.: WO2016/076360
PCT Pub. Date: May 19, 2016

(65) Prior Publication Data
US 2018/0186132 A1  Jul. 5, 2018

(30) Foreign Application Priority Data

| Nov. 11, 2014 | (JP) | JP2014-228856 |
| Nov. 11, 2014 | (JP) | JP2014-228857 |
| Dec. 18, 2014 | (JP) | JP2014-256197 |
| Mar. 9, 2015 | (JP) | JP2015-045763 |

(51) Int. Cl.
B32B 27/32 (2006.01)
B32B 27/26 (2006.01)
(Continued)

(52) U.S. Cl.
CPC .............. *B32B 27/26* (2013.01); *B32B 7/12* (2013.01); *B32B 27/08* (2013.01); *B32B 27/10* (2013.01); *B32B 27/18* (2013.01); *B32B 27/32* (2013.01); *B32B 27/327* (2013.01); *E04F 13/0866* (2013.01); *B32B 2250/03* (2013.01); *B32B 2250/05* (2013.01); *B32B 2255/10* (2013.01);
(Continued)

(58) Field of Classification Search
CPC .......... B32B 7/06; B32B 27/18; B32B 27/302
USPC ................................................. 428/34.1, 35.7
See application file for complete search history.

(56) References Cited

U.S. PATENT DOCUMENTS

2014/0147657 A1    5/2014   Brown et al.

FOREIGN PATENT DOCUMENTS

| JP | 2-128843 | 5/1990 |
| JP | 4-83664 | 3/1992 |

(Continued)

OTHER PUBLICATIONS

International Search Report dated Feb. 16, 2016 issued in corresponding International Patent Application No. PCT/JP2015/081745.
(Continued)

*Primary Examiner* — Ellen S Hock

(57) ABSTRACT

A decorated sheet according to the present disclosure consists of a plurality of resin layers, wherein at least one of the resin layers comprises a nano-sized additive.

12 Claims, 5 Drawing Sheets

(51) Int. Cl.
- *B32B 27/18* (2006.01)
- *B32B 7/12* (2006.01)
- *B32B 27/10* (2006.01)
- *B32B 27/08* (2006.01)
- *E04F 13/08* (2006.01)

(52) U.S. Cl.
CPC ....... *B32B 2255/26* (2013.01); *B32B 2264/10* (2013.01); *B32B 2264/102* (2013.01); *B32B 2264/104* (2013.01); *B32B 2264/108* (2013.01); *B32B 2307/412* (2013.01); *B32B 2307/516* (2013.01); *B32B 2307/518* (2013.01); *B32B 2307/704* (2013.01); *B32B 2323/10* (2013.01); *B32B 2451/00* (2013.01); *B32B 2607/02* (2013.01)

(56) References Cited

FOREIGN PATENT DOCUMENTS

| JP | 6-1881 | 1/1994 |
|----|--------|--------|
| JP | 6-198831 | 7/1994 |
| JP | 9-328562 | 12/1997 |
| JP | 2000-85076 | 3/2000 |
| JP | 2000-301682 | 10/2000 |
| JP | 2001-270054 | 10/2001 |
| JP | 2005-002308 A | 1/2005 |
| JP | 2005-113281 A | 4/2005 |
| JP | 2007-077345 A | 3/2007 |
| JP | 2007-100045 A | 4/2007 |
| JP | 2010-069710 A | 4/2010 |
| JP | 5271770 | 10/2010 |
| JP | 2011-201323 | 10/2011 |
| JP | 2012-30524 | 2/2012 |
| JP | 2013122020 | * 6/2013 |
| JP | 2014-198469 A | 10/2014 |

OTHER PUBLICATIONS

Translation of the International Preliminary Report on Patentability dated May 26, 2017 in corresponding International Patent Application No. PCT/JP2015/081745.

Extended European Search Report dated May 17, 2018, in corresponding European Patent Application No. 15859453.1, 9 pgs.

Office Action dated Jul. 23, 2019 in Japanese Patent Application No. 2015-216634 (3 pages).

* cited by examiner

DECORATED SHEET

TECHNICAL FIELD

The present invention relates to a decorated sheet used for building decorating materials used for the exterior and interior of buildings, the surfaces of doors and screens, surfacing materials of household electric appliances, and the like, and relates to a decorated sheet used as a decorated panel by being laminated on a wooden board, an inorganic board, a metal plate, and the like.

BACKGROUND ART

In recent years, as shown in Patent Literatures 1 to 5, a large number of decorated sheets in which olefin resins are used are proposed as decorated sheets alternative to decorated sheets made of polyvinyl chloride that raises concerns for environmental protection.

However, while such decorated sheets do not use a vinyl chloride resin, and thus the generation of toxic gas and the like during incineration is suppressed, the surface abrasion resistance is poor because of the use of a commonly used polypropylene sheet or flexible polypropylene sheet, and is far inferior to the abrasion resistance of conventional polyvinyl chloride decorated sheets.

The present inventors conducted research for a highly crystalline polypropylene resin having an initial flexural modulus of 1000 MPa or more and found that such highly crystalline polypropylene has excellent abrasion resistance (see Patent Literature 6), but performing bending processing such as V-groove bending processing may result in a break of a film or a crack in an outer circumferential part in post-processing depending on the processing conditions such as processing shape, processing temperature, and processing speed thereof. Moreover, those having 5% or more polyethylene that is added to improve film formability may whiten when V-groove bending processing is performed due to the poor compatibility between polyethylene and polypropylene.

On the other hand, according to Patent Literature 7, a decorated sheet that has enhanced resistance to post-processing such as V-groove bending and enhanced abrasion resistance of the decorated sheet surface is achieved by way of a decorated sheet having a transparent resin layer containing as a main component a highly crystalline polypropylene resin having a pentad fraction (mmmm fraction) of 96% or more, a melt flow rate (MFR) at 230° C. of 5 to 40 g/10 min, a molecular weight distribution (MWD=Mw/Mn where Mw is a weight average molecular weight and Mn is a number average molecular weight) of 4 or less, and an average spherulite particle size of 1 to 20 μm.

However, according to Patent Literature 7, an increase in crystallinity results in enhanced abrasion resistance but poses problems in that cracks and voids are likely to be generated during V-groove bending processing, it is thus necessary to control the melt flow rate, molecular weight distribution, and spherulite size, and, in particular, when the spherulite size is less than 1 μm due to, for example, the addition of a nucleating agent, cracks and voids are generated by interfacial fractures between spherulites and brittle fractures of spherulites, resulting in whitening. In fact, while a decorated sheet disclosed in Comparative Example 3 of Patent Literature 7, obtained by adding sodium 2,2-methyl-enebisphosphate as a nucleating agent to a highly crystalline polypropylene resin having a pentad fraction of 97.8%, a melt flow rate of 15 g/10 min (230° C.) and a molecular weight distribution of 2.3 and configuring the average particle size of spherulites to be 1 μm or less, has extremely good abrasion resistance, it is indicated that whitening occurred during V-groove bending processing.

The present inventors greatly improved V-groove bending processability and simultaneously achieved post-processing resistance and surface abrasion resistance by way of a decorated sheet that has at least a transparent resin layer containing as a main component 90 to 100% by weight of a crystalline polypropylene resin having an initial flexural modulus of 1000 MPa or more and 2200 MPa or less, a tensile breaking elongation of 200% or more, and a molecular weight distribution MWD of 4 or less and that has a total thickness of 80 μm or more and 250 μm or less, but the whitening and breaking of the transparent resin layer may become problematic in conditions such as high-speed bending in a low-temperature environment. There is also a drawback that whitening makes a damaged part noticeable even when damage is shallow. Accordingly, in order to address these drawbacks, the present inventors proposed a decorated sheet having excellent surface abrasion resistance and post-processability as described in Patent Literature 8. However, as applications of decorated plates in which such a decorated sheet is used increasingly broaden, and consumers are increasingly aware of quality, there are demands for further enhancement of surface abrasion resistance and post-processing resistance to bending processing such as V-groove bending.

Normally, polypropylene resins appear milky white because the spherulite size is greater than the wave length of visible light (400 to 750 nm), but since a transparent resin layer needs to protect a pattern layer and a primary sheet provided therebelow and also allow a pattern, a design, or the like printed thereon to clearly appear on the outer-most surface of a decorated sheet, a material used for a transparent resin layer is required to have particularly high transparency from the aesthetic viewpoint.

In addition to the above problems, polyolefin resins such as polypropylene resins are problematic in that it is difficult to satisfy technical criteria for noncombustible materials because of superior combustibility.

As a method for enabling a decorated sheet using a polyolefin resin to satisfy technical criteria for a noncombustible material set forth in Article 108bis(1) and (2) of the Building Standard Law Enforcement Order, it is contemplated that a filler is replace some of the polyolefin resin used for a sheet material with and thereby reduce the oxygen consumption associated with the combustion of the polyolefin resin to suppress the amount of heat released during the combustion of the decorated sheet, but since the mechanical strength of the resulting sheet material is significantly lowered when the resin material is replaced with a large amount of filler, a loading of about 20% is the limit.

Patent Literature 9 discloses that filler particles have mutually aggregating characteristics, it is thus difficult to uniformly disperse a filler in a resin material, accordingly it is difficult to fill a resin material with a large amount of filler, therefore dispersibility in a resin material is enhanced by using two kinds of fillers or specifically a layered silicate and a metal hydroxide in combination, also, the oxygen consumption during combustion is reduced by the chemical action of the two kinds of fillers to suppress the amount of released heat, and a decorated sheet that satisfies the technical criteria for a noncombustible material is thus obtained. However, since there is a limit to the reduction of oxygen consumption by the chemical action of two or more kinds of fillers as in Patent Literature 9, there are demands for the development of a decorated sheet in which a resin material can be filled with a large amount of filler and the amount of resin is fundamentally reduced.

CITATION LIST

Patent Literature

Patent Literature 1: Japanese Unexamined Patent Application Publication No. H2-128843
Patent Literature 2: Japanese Unexamined Patent Application Publication No. H4-083664
Patent Literature 3: Japanese Unexamined Patent Application Publication No. H6-001881
Patent Literature 4: Japanese Unexamined Patent Application Publication No. H6-198831
Patent Literature 5: Japanese Unexamined Patent Application Publication No. H9-328562
Patent Literature 6: Japanese Unexamined Patent Application Publication No. 2000-085076
Patent Literature 7: Japanese Unexamined Patent Application Publication No. 2001-270054
Patent Literature 8: Japanese Unexamined Patent Application Publication No. 2000-301682
Patent Literature 9: Japanese Patent No. 5271770

SUMMARY OF INVENTION

Technical Problem

An object of the present invention is to provide a decorated sheet that sufficiently satisfies the requirements required according to the intended use or the like.

As a result of having conducted diligent research, the present inventors have found that excellent dispersibility can be achieved by adding a nano-treated additive (a nano-sized additive) to each resin layer, and accomplished the present invention. One example of a method for obtaining the nano-sized additive is forming the additive into a vesicle, or that is to say, encapsulating the nano-sized additive within an outer membrane.

Solution to Problem

In order to achieve the above object, the decorated sheet of the first aspect of the present invention is a decorated sheet consisting of a plurality of resin layers, wherein at least one of the resin layers comprises a nano-sized additive.

In the decorated sheet of the second aspect of the present invention, a primary film layer, a transparent resin layer, and a top coat layer are layered in this order, and at least one from between the transparent resin layer and the top coat layer consists of the resin layer comprising the nano-sized additive.

In the decorated sheet of the third aspect of the present invention, the transparent resin layer consists of the resin layer comprising the nano-sized additive, and comprises 90 to 100% by weight of a crystalline polypropylene resin as a main component and a nucleating agent as the nano-sized additive.

In the decorated sheet of the fourth aspect of the present invention, the haze value of the transparent resin layer is 15% or less.

In the decorated sheet of the fifth aspect of the present invention, the transparent resin layer has a tensile elastic modulus of 800 MPa or more and 2000 MPa or less and a tensile breaking elongation of 200% or more.

In the decorated sheet of the sixth aspect of the present invention, the crystalline polypropylene resin is a highly crystalline polypropylene resin having an isotactic pentad fraction (mmmm fraction) of 95% or more.

In the decorated sheet of the seventh aspect of the present invention, the transparent resin layer has a thickness of 20 μm or more and 250 μm or less.

In the decorated sheet of the eighth aspect of the present invention, the top coat layer consists of the resin layer comprising the nano-sized additive, and comprises a dispersant as the nano-sized additive and inorganic fine particles.

In the decorated sheet of the ninth aspect of the present invention, the top coat layer is in a state where the inorganic fine particles are blended in a proportion of 0.1 to 30 parts by weight based on 100 parts by weight of a resin material being a main component of the top coat layer.

In the decorated sheet of the tenth aspect of the present invention, the resin material is a curable resin.

In the decorated sheet of the eleventh aspect of the present invention, the curable resin is at least one of a heat-curable resin and a photo-curable resin.

In the decorated sheet of the twelfth aspect of the present invention, the inorganic fine particles are at least one of alumina, silica, boehmite, iron oxide, magnesium oxide, and diamond.

In the decorated sheet of the thirteenth aspect of the present invention, the primary film layer consists of the resin layer comprising the nano-sized additive, and comprises a dispersant as the nano-sized additive and an inorganic filler.

In the decorated sheet of the fourteenth aspect of the present invention, the dispersant is at least one of a polymeric surfactant, a fatty acid metal salt, a silane coupling agent, a titanate coupling agent, silicone, wax, and a modified resin.

In the decorated sheet of the fifteenth aspect of the present invention, the primary film layer is in a state where the inorganic filler is blended in a proportion of 50 to 900 parts by weight based on 100 parts by weight of a polyolefin resin being a main component of the primary film layer.

In the decorated sheet of the sixteenth aspect of the present invention, the inorganic filler comprises calcium carbonate.

In the decorated sheet of the seventeenth aspect of the present invention, the primary film layer consists of a uniaxially stretched sheet or a biaxially stretched sheet.

In the decorated sheet of the eighteenth aspect of the present invention, the decorated sheet of the thirteenth to seventeenth aspects when in a state of being laminated with a noncombustible substrate is a noncombustible material satisfying requirements set forth in Article 108bis(1) and (2) of the Enforcement Order of the Building Standard Law in fire testing by a corn calorimeter in accordance with ISO 5660-1.

In the decorated sheet of the nineteenth aspect of the present invention, the nano-sized additive is a vesicle.

In the decorated sheet of the twentieth aspect of the present invention, the vesicle has an outer membrane, the outer membrane being a single-layer membrane.

In the decorated sheet of the twenty first aspect of the present invention, the outer membrane consists of a phospholipid.

The decorated sheet of the twenty second aspect of the present invention has at least a transparent resin layer comprising as a main component 90 to 100% by weight of a crystalline polypropylene resin having an isotactic pentad fraction (mmmm fraction) of 95% or more, wherein an average particle size of a spherulite of a crystal part consisting of the crystalline polypropylene resin of the transparent resin layer is 2000 nm or less.

In the decorated sheet of the twenty third aspect of the present invention, the crystal part has 0 to 20% by weight of a pseudohexagonal part and 80 to 100% by weight of a monoclinic part.

In the decorated sheet of the twenty fourth aspect of the present invention, the crystalline polypropylene resin has a melt flow rate (MFR) at 230° C. of 3 to 40 g/10 min and a molecular weight distribution (MWD=Mw/Mn) of 4 or less.

In the decorated sheet of the twenty fifth aspect of the present invention, the transparent resin layer comprises a nucleating agent, the nucleating agent being encapsulated within a vesicle and added.

In the decorated sheet of the twenty sixth aspect of the present invention, the vesicle has an outer membrane, the outer membrane being a single-layer membrane consisting of a phospholipid.

In the decorated sheet of the twenty seventh aspect of the present invention, a thickness of the transparent resin layer is 20 μm or more and 250 μm or less.

The decorated sheet of the present invention may have any one of the features of the decorated sheets of the above aspects, or may have a plurality of features in combination.

Advantageous Effects of Invention

According to the present invention, it is possible to provide a decorated sheet comprising a transparent resin layer, which does not cause concern about the generation of toxic gas or the like during incineration because no vinyl chloride resin is used in the decorated sheet, and which has higher transparency and better surface abrasion resistance and post-processing resistance than decorated sheets in which a conventional crystalline polypropylene resin is used for a transparent resin layer because the decorated sheet has a transparent resin layer containing a nano-sized nucleating agent.

It is possible to provide a decorated sheet which achieves higher transparency and better surface abrasion resistance and post-processing resistance than conventional decorated sheets because the decorated sheet has a top coat layer containing a nano-sized dispersant and inorganic fine particles.

Moreover, it is possible to provide a decorated sheet which satisfies the technical criteria for a noncombustible material and has excellent mechanical strength and post-processing resistance as a film, and even the carbon dioxide emissions of which can be reduced when disposed of, because the decorated sheet has a primary film layer containing a nano-sized dispersant and an inorganic filler.

Also, it is possible to provide a decorated sheet which comprises a transparent resin layer and a top coat layer having high transparency from the aesthetics viewpoint and excellent surface abrasion resistance and post-processing resistance not allowing an influence of post-processing such V-groove bending processing, satisfies the technical criteria for a noncombustible material, and even the carbon dioxide emissions of which can be reduced when disposed of, because the decorated sheet has a transparent resin layer containing a nano-sized nucleating agent, a top coat layer containing a nano-sized dispersant and inorganic fine particles, and a primary film layer containing a nano-sized dispersant and an inorganic filler.

DESCRIPTION OF EMBODIMENTS

Figure 1:
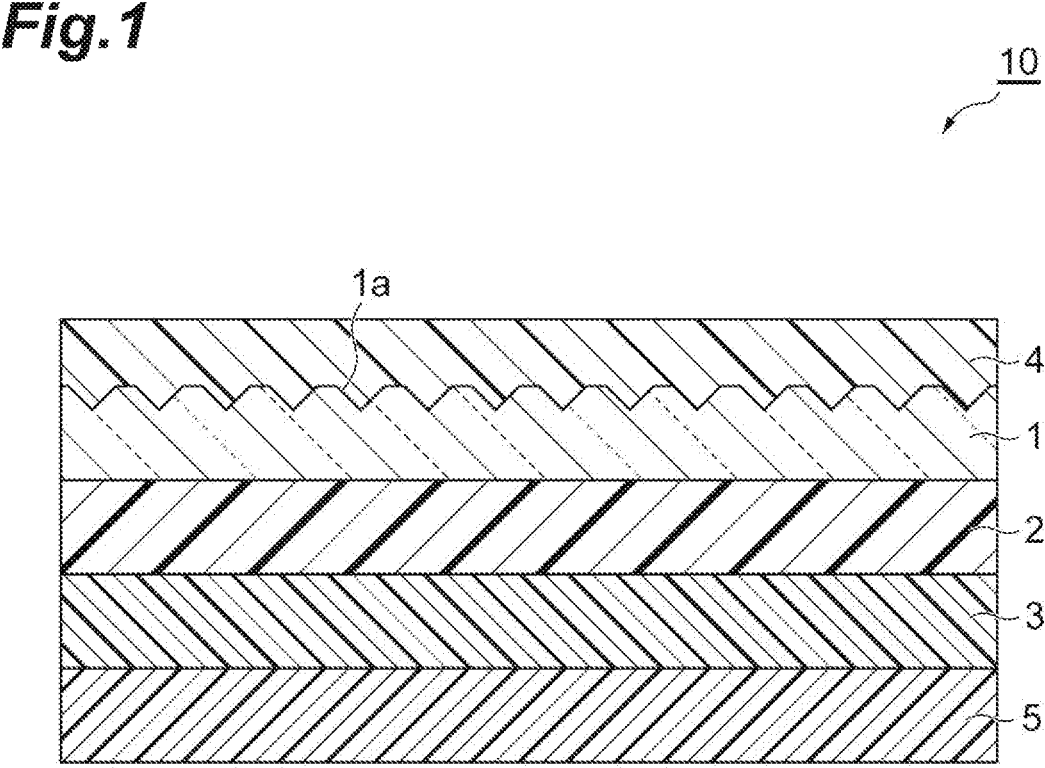
FIG. 1 is a cross-sectional view showing the first to third embodiments of the decorated sheet of the present invention.

The decorated sheet of the present invention is a decorated sheet consisting of a plurality of resin layers, wherein at least one of the resin layers contains a nano-sized additive. More specifically, it is preferable for the nano-sized additive to have an average particle size of 375 nm or less. Furthermore, it is preferable for the nano-sized additive to be encapsulated within an outer membrane. The additive encapsulated within the outer membrane is in a vesicular state, and the outer membrane and the additive that is the encapsulated substance may be collectively referred to as a vesicle. In other words, the nano-sized additive is encapsulated within a vesicle. More preferably, the vesicle is configured to have an outer membrane that is a single-layer membrane.

The nano-sized additive refers to an additive formed into nano-sized particles by a technique that impart a nano size to an additive (a nano treatment) (hereinafter a particulate substance may be simply referred to as "particles", and a particulate additive to "additive particles"). As the nano treatment, for example, methods can be used such as a solid-phase method in which mechanical crushing is mainly performed on an additive to obtain nano-sized particles, a liquid-phase method in which nano-sized particles are synthesized or crystallized in an additive or in a solution in which the additive is dissolved, and a gas-phase method in which nano-sized particles are synthesized or crystallized from an additive or a gas or steam consisting the additive. Brief examples of specific means for performing the respective methods include a ball mill, a bead mill, a rod mill, a colloid mill, a conical mill, a disk mill, a hammer mill, and a jet mill for the solid-phase method; a crystallization method, a co-precipitation method, a sol-gel method, a liquid-phase reduction method, and a hydrothermal synthesizing method for the liquid-phase method; and an electric furnace method, a chemical flame method, a laser method, and a thermal plasma method for the gas-phase method.

For a description of a more specific method for the nano treatment, as a specific example of the solid-phase method, a mixture of 100 g of isopropyl alcohol and 50 g of sodium 2,2'-methylenebis(4,6-di-tertiary butylphenyl)phosphonate is bead-milled for 60 minutes using 30 μm stabilized zirconia beads, and thus nano-sized nucleating agent particles having an average particle size of about 100 nm to 150 nm can be obtained. As a specific example of the crystallization method, for example, 50 g of sodium 2,2'-methylenebis(4,6-di-tertiary butylphenyl)phosphonate is dissolved in a mixed solvent consisting of 96 g of xylene, 72 g of isopropyl alcohol, and 24 g of water, this solution is brought into contact with a poor solvent such as ethanol in a microreactor, and thus nano-sized nucleating agent particles having an average particle size of about 1 nm to 150 nm can be precipitated.

Herein, the vesicle refers to a sac-like capsule having a membrane structure closed as a spherical shell, and, in particular, one including a liquid phase or a solid phase inside is referred to as a vesicle. In the present invention, the additive constitutes the liquid phase or the solid phase of the vesicle. Due to the mutually repelling action of respective outer membranes, vesicles do not allow particles (the additive) to aggregate, and thus have extremely high dispersibility. This action enables the additive to be uniformly dispersed in the resin compositions that constitute the respective resin layers. Examples of the technique (a vesicle forming treatment) for obtaining the additive as a vesicle include a Bangham method, an extrusion method, a hydration method, a surfactant dialysis method, a reverse phase evaporation method, a freeze-thaw method, and a supercritical reverse phase evaporation method. For a brief description of such a vesicle forming treatment, the Bangham method is a method for obtaining a vesicle by introducing chloroform or a chloroform/methanol mixed solvent into a vessel such as a flask, further introducing and dissolving a phospholipid, then removing the solvent by using an evaporator to form a thin film consisting of a lipid, adding a dispersion of an additive, and then performing hydration/dispersion with a vortex mixer. The extrusion method is a method for obtaining a vesicle by preparing a thin film of a phospholipid solution, and causing it to pass through a filter used in place of the mixer used as external perturbation in the Bangham method. While the hydration method is a preparation method nearly the same as the Bangham method, a vesicle is obtained by mild stirring for dispersion without using a mixer. The reverse phase evaporation method is a method for obtaining a vesicle by dissolving a phospholipid in diethyl ether or chloroform, adding an additive-containing solution to make a W/O emulsion, removing the organic solvent from the emulsion under reduced pressure, and then adding water. The freeze-thaw method is a method in which cooling/heating is used as external perturbation, and is a method for obtaining a vesicle by repeating this cooling/heating.

In particular, an example of a method for obtaining a vesicle having an outer membrane consisting of a single-layer membrane is a supercritical reverse phase evaporation method. The supercritical reverse phase evaporation method is a method for preparing a capsule encapsulating a target substance using carbon dioxide in a supercritical state or under a temperature condition or a pressure condition equal to or higher than the critical point. Carbon dioxide in a supercritical state means carbon dioxide in a supercritical state at a critical temperature (30.98° C.) and a critical pressure (7.3773±0.0030 MPa) or higher, and carbon dioxide under a temperature condition or a pressure condition equal to or higher than the critical point means carbon dioxide under a condition where only the critical temperature or only the critical pressure exceeds the critical condition.

As for a specific vesicle forming treatment by the supercritical reverse phase evaporation method, an aqueous phase is introduced into a mixed fluid of supercritical carbon dioxide, a phospholipid as an outer-membrane forming substance, and an additive as an encapsulated substance, and stirred, and thereby an emulsion of supercritical carbon dioxide and an aqueous phase is produced. Thereafter, reducing the pressure causes carbon dioxide to expand/evaporate, resulting in phase inversion, and nanocapsules where the surfaces of additive particles are covered with a single-layer membrane of the phospholipid are produced. Unlike conventional encapsulation methods by which the outer membrane on the additive particle surface is a multilayer membrane, a capsule with a single-layer membrane can be easily produced by using this supercritical reversed phase evaporating method, and therefore a capsule having a smaller diameter can be prepared. A capsule with a multi-layer membrane, if desired, can be easily prepared by introducing supercritical carbon dioxide into a mixed fluid of a phospholipid, an additive, and an aqueous phase. Examples of the phospholipid used as an outer membrane forming substance (a first outer membrane forming dispersant) when preparing a vesicle include glycerophospholipids such as phosphatidylcholine, phosphatidylethanolamine, phosphatidylserine, phosphatidic acid, phosphatidylglycerol, phosphatidylinositol, cardiolipin, egg yolk lecithin, hydrogenated egg yolk lecithin, soy lecithin, and hydrogenated soy lecithin; and sphingophospholipids such as sphingomyelin, ceramide phosphorylethanolamine, and ceramide phosphoryl glycerol. Having an outer membrane that consists of a phospholipid, the vesicle can achieve excellent compatibility with a resin material.

The vesicle may have an outer membrane consisting of a second outer membrane forming dispersant different from the first outer membrane forming dispersant. Examples of the second outer membrane forming dispersant include a polymeric surfactant, a fatty acid metal salt, a silane coupling agent, a titanate coupling agent, silicone, wax, and a modified resin. Examples of the polymeric surfactant include aliphatic polycarboxylic acids, polycarboxylic acids alkyl amines, polyacrylic acids, polymethacrylic acids, polyoxyethylene alkyl ethers, and sorbitan fatty acid esters. Examples of the fatty acid metal salt include stearic acid, lauric acid, 12-hydroxystearic acid, montanic acid, behenic acid, recinoleic acid, and myristic acid that are bonded to lithium, sodium, potassium, magnesium, calcium, barium, zinc, and aluminum. Examples of the silane coupling agent include 3-methacryloxypropyltriethoxysilane, 3-methacryloxypropyltrimethoxysilane, vinyltriethoxysilane, vinyltrimethoxysilane, phenyltrimethoxysilane, 3-isocyanatopropyltriethoxysilane, and 2-(3,4-epoxycyclohexyl)ethyltrimethoxysilane. Examples of the titanate coupling agent include tetrakis[2,2-bis(allyloxymethyl)butoxy]titanium(IV), di-i-propoxy titanium diisostearate, (2-n-butoxycarbonylbenzoyloxy)tributoxytitanium, isopropyl titanium triisostearate, di-n-butoxybis(triethanolaminato)titanium, tetrakis(2-ethylhexyloxy)titanium, and di-i-propoxybis(acetylacetonato)titanium. Examples of the silicone include dimethyl silicone oil, methyl phenyl silicone oil, methyl hydrogen silicone oil, cyclic dimethyl silicone oil, alkyl modified silicone oil, long chain alkyl modified silicone oil, and higher fatty acid modified silicone oil, obtained by polymerizing olefins or thermally degrading polyolefins and, further, oxidizing or modifying the resultants with maleic acid, sulfonic acid, carboxylic acid, or rosin acid. Examples of the resin include those obtained by modifying polyolefins with maleic acid, sulfonic acid, carboxylic acid, or rosin acid.

The decorated sheet of the present invention can be used in form laminated with a substrate. An example of a specific aspect is an aspect in which a primary film layer, a transparent resin layer, and a top coat layer are layered in this order from the substrate side, and, among these, at least one from between the transparent resin layer and the top coat layer consists of a resin layer containing a nano-sized additive.

When the transparent resin layer consists of a resin layer containing a nano-sized additive, the resin composition constituting the transparent resin layer contains a transparent resin and a nano-sized additive. An example of the main component of the transparent resin is a crystalline polypropylene resin. The content of the crystalline polypropylene resin in the transparent resin is 90 to 100 parts by weight based on 100 parts by weight of the transparent resin, and may be 90 to 99.9 parts by weight or 90 to 99.0 parts by weight. An example of the nano-sized additive is a nucleating agent. More preferably, the nano-sized additive is contained in a vesicular state (a nucleating agent vesicle). In this case, it is preferable for the nucleating agent vesicle to have an average particle size that is ½ or less than the wave length of visible light, and specifically, it is preferable that the average particle size be 375 nm or less because the wavelength region of visible light is 400 to 750 nm. The content of the nucleating agent in the transparent resin layer (based on 100 parts by weight of the total weight of the transparent resin layer) is preferably 0.0001 to 0.1 parts by weight, and is more preferably 0.0002 to 0.05 parts by weight. In such a transparent resin layer, it is preferable that the haze value be 15% or less and more preferably 10% or less, the tensile elastic modulus be 800 MPa or more and 2000 MPa or less, and the tensile breaking elongation be 200% or more by adjusting the cooling conditions during film formation.

The crystalline polypropylene resin can be designed by suitably selecting from isotactic polypropylene and syndiotactic polypropylene having different pentad fractions, random polypropylene, block polypropylene, and mixtures thereof. More preferably, it is preferable for the crystalline polypropylene resin to be a highly crystalline homopolypropylene resin that is a homopolymer, i.e., a polymer polymerized singularly by propylene having an isotactic pentad fraction (mmmm fraction) of 95% or more and more preferably 96% or more. Resins other than crystalline polypropylene constituting the transparent resin layer can be suitably selected according to the purpose of blending them as long as the physical properties of crystalline polypropylene are not adversely affected in a significant manner. Note that, in order to maintain V-groove bending processability, it is preferable that resins have good compatibility with the crystalline polypropylene resin constituting the transparent resin layer.

It is preferable for such a transparent resin layer to have a thickness of 20 µm or more and 250 µm or less.

The nano-sized nucleating agent has an extremely small particle diameter at a nano size, and therefore the number and the surface area of nucleating agent particles present per unit volume increase in an inversely proportional manner relative to the cube of the particle diameter. As a result, the distance between nucleating agent particles is short, and therefore when crystal growth from the surface of one nucleating agent particle added to the polypropylene resin occurs, the end of a growing crystal immediately contacts the end of a crystal growing from the surface of another nucleating agent particle adjacent to the aforementioned nucleating agent particle, the ends of the respective crystals inhibit growth, the growth of each crystal is stopped, and therefore the average particle size of spherulites in the crystal part of the crystalline polypropylene resin can be extremely reduced.

Accordingly, due to the nano-sized nucleating agent contained in the transparent resin layer, a larger amount of finer crystal nuclei are generated in the resin than with conventional nucleating agents, and, as a result, it has been succeeded that the distance between crystal nuclei in the crystal part is shortened, the growth of each crystal is suppressed, and the average particle size of spherulites is extremely reduced. In addition, in such a crystalline polypropylene resin, high transparency as excellent as a haze value of 15% or less is achieved.

Moreover, due to the nano-sized nucleating agent contained in a vesicular state, i.e., as a nucleating agent vesicle, the mutual aggregation of the nucleating agent is prevented, and high dispersibility in a resin material is achieved. In the resin composition, the outer membrane of the nucleating agent vesicle partially collapses and arrives at a state where the nucleating agent is exposed, and during the course of crystallization of the resin material, spherulites are formed in which the nano-sized nucleating agent particles serve crystal nuclei.

At this time, in particular, the nucleating agent vesicle obtained by a supercritical reverse phase evaporation method has an extremely small size, and, therefore, in the crystal part of the crystalline polypropylene resin, the average particle size of spherulites can be extremely reduced, and the crystallinity of the crystal part can be dramatically enhanced.

In the decorated sheet of the present invention, due to the nano-sized nucleating agent or more preferably the nucleating agent vesicle contained in the transparent resin layer, the average particle size of spherulites in the crystal part of the crystalline polypropylene resin is extremely reduced, and excellent abrasion resistance is achieved. In particular, due to the nucleating agent vesicle contained, the nucleating agent is uniformly dispersed in the crystalline polypropylene resin to control the crystallinity of crystalline polypropylene so that the hardness and the ductility of the transparent resin layer are optimally adjusted, and it is possible to achieve excellent abrasion resistance and post-processing resistance where the tensile elastic modulus is 800 MPa or more and 2000 MPa or less and the tensile breaking elongation is 200% or more.

It is preferable for the decorated sheet of the present invention to be a decorated sheet having at least a transparent resin layer containing as a main component 90 to 100% by weight of a crystalline polypropylene resin having an isotactic pentad fraction (mmmm fraction) of 95% or more, wherein the average particle size of spherulites of the crystal part consisting of the crystalline polypropylene resin of the transparent resin layer is 2000 nm or less. According to such a decorated sheet, the average particle size of spherulites of the crystal part of the crystalline polypropylene resin is 2000 nm or less, and it is thus possible to provide a decorated sheet having extremely good abrasion resistance.

It is preferable for the crystal part that a pseudohexagonal part be 0 to 20% by weight, and a monoclinic part be 80 to 100% by weight. By configuring the compositional ratio of the pseudohexagonal part to the monoclinic part to be at the above value, a transparent resin layer having excellent abrasion resistance and post-processing resistance (breaking resistance and whitening resistance) can be obtained. The pseudohexagonal system refers to a system that has a regular hexagonal structure but is amorphous as a whole system, and a profile obtained when measurement is performed using an X-ray diffractometer or the like has a broader peak than that of the crystal hexagonal system.

Here, the characteristics of the pseudohexagonal part and the monoclinic part will now be described. A pseudohexagonal crystal is a metastable phase and has a crystal structure in which adjacent lamellas inside the crystal are easily shifted by stress. Such a pseudohexagonal crystal has characteristics exhibiting a behavior close to a liquid crystal (a smectic liquid crystal) in response to stress, the crystal easily undergoes plastic deformation in accordance with a change of the outer shape in bending processing in a post-processing step, therefore transparency can be maintained without breaking or whitening, and, in addition, even when impact stress is applied, the energy of impact can be absorbed through the plastic deformation of the crystal, and therefore impact resistance is also good. On the other hand, when the surface of the pseudohexagonal crystal is scratched with a hard object, a portion of the crystal brought into contact with the hard object easily undergoes plastic deformation and leaves a depression (damage).

In contrast, a monoclinic crystal is a stable phase and, since the molecular chain of the polypropylene resin is most densely packed, has a crystal structure in which slip deformation between adjacent lamellas is unlikely to occur. Accordingly, a monoclinic crystal even when the surface is scratched by a hard object well tolerates the stress of contact with the hard object, the crystal is unlikely to undergo plastic deformation, and, as a result, little damage is inflicted. On the other hand, it is difficult for the monoclinic crystal to undergo plastic deformation in accordance with a change of the outer shape in bending processing in a post-processing step, and therefore in order to follow a change of the outer shape, crystals need to mutually shift by generating fine delamination at the interface between crystals or the interface between the crystal part and the amorphous part for deformation. A hollow part generated by this fine delamination scatters transmitted light and is observed as whitening, and when delamination is severe, a large number of hollow parts generated inside the transparent resin layer are connected to each other as far as the front surface and the back surface of the transparent resin layer, and result in a crack or a break of a sheet. When impact stress is applied as well, the energy of impact cannot be sufficiently absorbed through the plastic deformation of the crystal, and, whitening, a crack, a break, and the like are likely to occur due to fine delamination at the interface between crystals or the interface between the crystal part and the amorphous part as above.

In the decorated sheet of the present invention, it is possible to suitably design two kinds of crystal parts having mutually different characteristics, such as the above pseudohexagonal part and monoclinic part, within the above range of the compositional ratio according to the intended application, and, for example, crystal parts are designed such that when a more priority is given to post-processing resistance than to abrasion resistance, the proportion of the pseudohexagonal part is increased, and in the opposite case, the proportion of the monoclinic part is increased.

The transparent resin layer is obtained by thermally melting and cooling a polypropylene resin, and crystallizes during the cooling. When optimizing the performance of the decorated sheet by way of the compositional ratio of the pseudohexagonal part to the monoclinic part in the crystal part, it is preferable to use a highly crystalline polypropylene resin having high stereoregularity as a polypropylene resin. As a polypropylene resin having high stereoregularity, it is preferable to use a highly crystalline polypropylene resin having an isotactic pentad fraction (mmmm fraction) of 95% or more, preferably 96% or more, and more preferably 97% or more.

Depending on the desired object such as an improvement of extrusion film formability and an enhancement of bending processability and impact resistance, it is possible to add another resin to the highly crystalline polypropylene resin as necessary, such as various olefin resins such as a random polymerization polypropylene resin, a low density polyethylene resin, and an olefin copolymer resin, and elastomeric components such as ethylene-propylene copolymer rubber, a styrene-butadiene copolymer or a hydrogenate thereof, and an ethylene-propylene-diene monomer copolymer. Note that when a resin that has poor compatibility with the highly crystalline polypropylene resin is used, delamination at the interface between the resins occurs when bending processing in a post-processing step is performed, thus causing whitening, a crack, a break, and the like. Also, increasing the amounts of these additional components added naturally results in that the excellent properties of the highly crystalline polypropylene resin are offset. Accordingly, the composition is such that the amounts of the above various additional components added are kept at 10% by weight or less, and the highly crystalline polypropylene resin is contained at least at 90% by weight or more and preferably 90 to 100% by weight.

In the decorated sheet of the present invention, it is desirable to use a crystalline polypropylene resin having a melt flow rate (MFR) at 230° C. of 3 to 40 g/10 min and a molecular weight distribution (MWD=Mw/Mn) of 4 or less. In the above-described plastic deformation in the crystal part, while it is preferable that adjacent lamellas in a crystal mutually shift in accordance with deformation by bending processing, the binding force exerted by tie molecules between lamellas is excessive and inhibits shifting when the molecular weight distribution is excessively larger or the melt flow rate is excessively smaller than the above values, thus the crystal part is unlikely to undergo plastic deformation and causes whitening, a crack, a break, and the like when bending processing in a post-processing step is performed. On the other hand, when the melt flow rate is excessively higher than the above value, the melt viscosity in the processing step is insufficient, and the shape retention is unstable.

Generally, in order to control the compositional ratio of the pseudohexagonal part to the monoclinic part that make up the crystal part of the highly crystalline polypropylene resin contained in the transparent resin layer, a well-known theory of crystal growth can be applied. The highly crystalline polypropylene resin does not become an amorphous form at a cooling rate of ordinary conditions of resin molding such as extrusion, but crystallization cannot completely progress to a monoclinic system, which is a stable phase, and crystals remain to be a pseudohexagonal system, which is a metastable phase, thus becoming a cause for being unable to obtain sufficient abrasion resistance. On the other hand, cooling gradually under special molding conditions, for example, by passing the resin through a slow cooling furnace after extrusion film formation and before cooling solidification allows a crystallization process to complete and yields a monoclinic system, but it is difficult to always control the average particle size of spherulites to 2000 nm or less.

Accordingly, it is preferable for the transparent resin layer to be obtained by mixing a polypropylene resin and the above nucleating agent particle vesicle, and molding the mixture. It is preferable for the vesicle to have an outer membrane that is a single-layer membrane consisting of a phospholipid. Having an outer membrane that is a single-layer membrane consisting of a phospholipid, the vesicle enables the spherulite size in the crystal part of the highly crystalline polypropylene resin to be even more uniform and extremely small, the average particle size of spherulites is thus 2000 nm or less, and, in particular, a decorated sheet having excellent abrasion resistance can be provided. In order to achieve an average particle size of 2000 nm or less of spherulites in the crystal part of the crystalline polypropylene resin in the transparent resin layer of the decorated sheet of the present invention, it is preferable for the nucleating agent to be contained uniformly and at a high concentration in the crystal part, and thus the distance between nucleating agent particles that serve as starting points of crystallization is extremely short, and there are a large number of nucleating agent particles having identical such distances, so small spherulites are obtained.

Below, the terms used in the above description will now be briefly explained.

The nucleating agent is what is added to promote production of crystal nuclei or to use the nucleating agent itself as crystal nuclei during crystallization of a resin, and there is a nucleating agent of a melting type that dissolves in a base material resin when added and precipitates again to produce crystal nuclei, or a non-melting type that a nucleating agent added to a base material becomes crystal nuclei while retaining its particle diameter as-is without melting. Examples of nucleating agents for the polypropylene resin include phosphoric acid ester metal salts, benzoic acid metal salts, pimelic acid metal salts, rosin metal salts, benzylidene sorbitol, quinacridone, cyanine blue, and talc. In particular, in the present invention, in order to obtain the maximum effect of the nano treatment, it is preferable to use phosphoric acid ester metal salts, benzoic acid metal salts, pimelic acid metal salts, and rosin metal salts that are a non-melting type and from which good transparency can be expected, while colored quinacridone, cyanine blue, talc, and the like can be used when the resin can be made transparent by the nano treatment. Melting-type benzylidene sorbitol may be suitably used as a mixture with a nucleating agent of a non-melting type.

The haze value is a value expressed in percent as obtained such that, when light that enters an object from one surface exits the other surface, a value (a diffuse transmittance) obtained by subtracting the integration value of only the linear components of light beams exiting the other surface (a linear transmittance) from the integration value of all light beams exiting the other surface (a total light transmittance) is divided by the total light transmittance, and a smaller value indicates higher transparency. This haze value is determined by the inner haze determined by the inner state of the object such as the crystallinity and spherulite size of the crystal part and the outer haze determined by the surface state of the object such as the presence and absence of depressions and projections on the entering surface and the exiting surface. In the present invention, what is simply referred to as a haze value means a value determined by the inner haze and the outer haze.

The tensile breaking elongation is a value indicating elongation when a sample is drawn at a predetermined rate and breaks, and is a value expressed in percent as obtained such that the length ($L_0$) of a sample before test is subtracted from the length (L) of the sample at break and the resulting value is divided by the length ($L_0$) of the sample before test, a smaller value indicates poor elongation that a crack and whitening occur during post-processing such as V-groove bending processing and therefore post-processing resistance is inferior, and a larger value indicates good elongation that post-processing can be easily performed and post-processing resistance is excellent.

The isotactic pentad fraction (mmmm fraction) is calculated from a numerical value (an electromagnetic wave absorbance) obtained by resonating the resin material constituting the above transparent resin layer at a predetermined resonant frequency by a $^{13}$C-NMR measurement method (a nuclear magnetic resonance measurement method) using carbon C (a nuclide) having a mass number of 13, and defines the atomic arrangement, electronic structure, and molecular microstructure in the resin material. The isotactic pentad fraction of a polypropylene resin is the proportion of a sequence of 5 propylene units determined by $^{13}$C-NMR, and is used as a measure of crystallinity or stereoregularity. Such an isotactic pentad fraction is one of the factors that mainly determine the abrasion resistance of a surface, and basically the higher the isotactic pentad fraction is, the higher the crystallinity of a sheet is, and therefore abrasion resistance is enhanced.

In the decorated sheet of the present invention, when the top coat layer consists of a resin layer containing the nano-sized additive, it is preferable that a dispersant as the nano-sized additive and inorganic fine particles be contained. More preferably, the nano-sized additive is contained in a vesicular state (a dispersant vesicle). When preparing the dispersant vesicle, the dispersant used as an encapsulated substance (a first encapsulated substance forming dispersant) can be suitably selected and used from dispersants referred to as second outer membrane forming dispersants. Also, when preparing the dispersant vesicle, the dispersant used as an outer membrane forming substance (a third outer membrane forming dispersant) can be suitably selected and used from dispersants referred to as first outer membrane forming dispersants.

The content of the dispersant in the top coat layer is preferably 0.01 to 3 parts by weight and more preferably 0.1 to 2 parts by weight based on 100 parts by weight of the resin material contained in the top coat layer.

It is preferable for the inorganic fine particles to be blended in a proportion of 0.1 to 30 parts by weight based on 100 parts by weight of the resin material, which is the main component of the top coat layer, no abrasion resisting effect is obtained when less than 0.1 parts by weight, and when more than 30 parts by weight, there is a concern about impaired transparency due to the light scattering action of fine particles as well as increased costs. Herein, the content of the inorganic fine particles based on the formed top coat layer is specified by the mixing ratio used when preparing the resin composition that constitutes the top coat layer, this is because the top coat layer formed from the resin composition obtained by adding the inorganic fine particles in the above content undergoes a phenomenon that, when post-processing such as bending processing is performed on the completed decorated sheet, the inorganic fine particles move in accordance with deformation caused by the processing, but the movement of the inorganic fine particles does not uniformly occur over the entirety of the top coat layer and, for example, the deformation of the resin is large in the vicinity of the surface, accordingly the amount of movement of the inorganic fine particles is also large, a difference is thus created between the density of the inorganic fine particles in the interior of the top coat layer and the density of the inorganic fine particles in the vicinity of the surface, and, therefore, concerning the formed top coat layer, it is difficult to generally specify the content of the inorganic fine particles contained per unit volume. When specifying the content of the inorganic fine particles in the formed top coat layer, it is necessary to separate the resin composition constituting the top coat layer into an inorganic material and an organic material and analyze the content of the inorganic fine particles contained in the inorganic material, and since a pre-treatment having a plurality of steps is required in order to conduct this analysis, specifying the content of the inorganic fine particles in the formed top coat layer requires a huge amount of time and is not realistic.

It is preferable that the resin composition contain as a main component a resin material consisting of a curable resin and that the curable resin consists of at least one of a heat-curable resin and a photo-curable resin, and a mixture of a heat-curable resin and a photo-curable resin may be used. The form of the curable resin may be aqueous, emulsion, solvent-based, or the like, and is not particularly limited.

Examples of the inorganic fine particles include fine particles of alumina, silica, boehmite, iron oxide, magnesium oxide, and diamond. Inorganic fine particles having an average particle size of 1 to 100 µm can be used, and, in particular, inorganic fine particles having about 1 to 30 µm are suitable.

As a heat-curable resin, it is preferable to use a two-component curable type urethane. The urethane heat-curable resin is suitable from the viewpoint of workability, price, cohesive force of the resin itself, and the like. A urethane resin obtained by reacting acrylic polyol and isocyanate may be used. The isocyanate can be suitably selected and used from curing agents such as tolylene diisocyanate (TDI), xylylene diisocyanate (XDI), hexamethylene diisocyanate (HMDI), diphenylmethane diisocyanate (MDI), lysine diisocyanate (LDI), isophorone diisocyanate (IPDI), hydrogenated tolylene diisocyanate (HTDI), hydrogenated xylylene diisocyanate (HXDI), trimethyl hexamethylene diisocyanate (TMDI), and derivatives (adducts, biurets, isocyanurates) and various prepolymers thereof. In consideration of weather resistance, it is preferable to use a curing agent based on hexamethylene diisocyanate (HMDI) that has a linear molecular structure, or isophorone diisocyanate (IPDI).

The photo-curable resin can be suitably selected and used from polyester acrylate, epoxy acrylate, urethane acrylate, acryl acrylate, and the like, and, in particular, it is preferable to use urethane acrylate or acryl acrylate that has good weather resistance (light resistance). As for a method for curing the photo-curable resin, it is preferable to perform curing by way of activation energy rays such as ultraviolet rays and electron beams from the viewpoint of workability.

As for the mixture of a heat-curable resin and a photo-curable resin, it is preferable to use as a mixture, for example, a urethane resin obtained by reacting acrylic polyol and isocyanate as a heat-curable resin and a urethane acrylate resin as a photo-curable resin, and thereby it is possible to enhance surface hardness, suppress cure shrinkage, and enhance adhesion to inorganic fine particles.

With such a decorated sheet having a top coat layer containing a nano-sized dispersant, or more preferably, the nano-sized dispersant in a vesicular state (a dispersant vesicle) and further containing inorganic fine particles, it is possible to provide a decorated sheet having high transparency and excellent abrasion resistance and post-processing resistance. This achieves the high dispersibility of the inorganic fine particles due to the action of the nano-sized dispersant uniformly dispersed in the resin composition constituting the top coat layer to prevent secondary aggregation of the inorganic fine particles, and achieves the high transparency and the excellent abrasion resistance and post-processing resistance of the top coat layer due to the suppression of a decrease of transparency and a decrease of mechanical strength resulting from aggregated inorganic fine particles. Moreover, by using a resin material consisting of a mixture of a heat-curable resin and a photo-curable resin as the main component of the resin composition constituting the top coat layer, it is possible to provide a decorated sheet having high abrasion resistance, optimal flexibility, and excellent post-processing resistance due to the crosslinking of the mixture.

In the case of a decorated sheet with an emphasis on aesthetics, abrasion resistance, and post-processing resistance, the primary film layer can be suitably selected and used from papers such as tissue paper, titanium paper, and resin impregnated paper, synthetic resins such as polyethylene, polypropylene, polystyrene, polybutylene, polycarbonate, polyester, polyamide, an ethylene-vinyl acetate copolymer, polyvinyl alcohol, and acryl, or foamed products of these synthetic resins, rubbers such as ethylene-propylene copolymer rubber, ethylene-propylene-diene copolymer rubber, styrene-butadiene-styrene block copolymer rubber, and polyurethane, organic or inorganic non-woven fabrics, synthetic papers, metal foils of aluminum, iron, gold, and silver, and the like.

In the case of a decorated sheet consisting of a noncombustible material, it is preferable to employ a primary film layer consisting of a resin layer containing the nano-sized additive, and it is preferable to contain a dispersant as the nano-sized additive and an inorganic filler. In particular, it is preferable for the nano-sized dispersant to be contained in a vesicular state (a dispersant vesicle). When preparing the dispersant vesicle, the dispersant used as an encapsulated substance (a second encapsulated substance forming dispersant) can be suitably selected and used from dispersants referred to as second outer membrane forming dispersants. Also, when preparing the dispersant vesicle, examples of the dispersant used as an outer membrane forming substance (a fourth outer membrane forming dispersant) include dispersants referred to as first outer membrane forming dispersants and the following dispersants. That is to say, further, examples of the fourth outer membrane forming dispersant include dispersants such as a nonionic surfactant and a mixture of this and cholesterol or triacylglycerol. Among these, as nonionic surfactants, usable are one or two or more of polyglycerin ether, dialkyl glycerin, polyoxyethylene hydrogenated castor oil, a polyoxyethylene alkyl ether, a polyoxyethylene sorbitan fatty acid ester, a sorbitan fatty acid ester, a polyoxyethylene polyoxypropylene copolymer, a polybutadiene-polyoxyethylene copolymer, polybutadiene-poly2-vinylpyridine, a polystyrene-polyacrylate copolymer, a polyethyleneoxide-polyethyl ethylene copolymer, and a polyoxyethylene-polycaprolactam copolymer. As cholesterols, usable are cholesterol, α-cholestanol, β-cholestanol, cholestane, desmosterol (5,24-cholestadien-3β-ol), sodium cholate, and cholecalciferol.

It is preferable for the primary film layer to contain a polyolefin resin. It is preferable for the inorganic filler to be contained in a proportion of 50 to 900 parts by weight based on 100 parts by weight of the polyolefin resin, which is the main component of the primary film layer. Herein, the content of the inorganic filler based on the formed primary film layer is specified by the mixing ratio used when preparing the resin composition that constitutes the primary film layer, this is because the primary film layer formed from the resin composition obtained by adding the inorganic filler in the above content undergoes a phenomenon that, when post-processing such as bending processing is performed on the completed decorated sheet, the inorganic filler moves in accordance with deformation caused by the processing, but the movement of the inorganic filler does not uniformly occur over the entirety of the primary film layer, and, for example, the deformation of the resin is large in the vicinity of the surface, accordingly the amount of movement of the inorganic filler is also large, a difference is thus created between the density of the inorganic filler in the interior of the primary film layer and the density of the inorganic filler in the vicinity of the surface, and, therefore, concerning the formed primary film layer, it is realistically difficult to generally specify the content of the inorganic filler contained per unit volume. When specifying the content of the inorganic filler in the formed primary film layer, it is necessary to separate the resin composition constituting the primary film layer into an inorganic material and an organic material and analyze the content of the inorganic filler contained in the inorganic material, and since a pre-treatment having a plurality of steps is required in order to conduct this analysis, specifying the content of the inorganic filler in the formed primary film layer requires a huge amount of time and is not realistic.

Examples of the inorganic filler include calcium carbonate, talc, and titanium oxide. In particular, as for calcium carbonate, it is easy to control the particle size by a production method and control compatibility with the polyolefin resin by surface treatment, also the material cost is low, and therefore it is suitable also from the viewpoint of reducing the cost of the decorated sheet.

Examples of the polyolefin resin include, in addition to polypropylene, polyethylene, polybutene and the like, those obtained by homopolymerizing, or copolymerizing two or more of, α olefins (such as propylene, 1-butene, 1-pentene, 1-hexene, 1-heptene, 1-octene, 1-nonene, 1-decene, 1-undecene, 1-dodecene, tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 3-ethyl-1-hexene, 9-methyl-1-decene, 11-methyl-1-dodecene, and 12-ethyl-1-tetradecene), and those obtained by copolymerizing ethylene or an α olefin with another monomer, such as an ethylene-vinyl acetate copolymer, an ethylene-vinyl alcohol copolymer, an ethylene-methyl methacrylate copolymer, an ethylene-ethyl methacrylate copolymer, an ethylene-butyl methacrylate copolymer, an ethylene-methyl acrylate copolymer, an ethylene-ethyl acrylate copolymer, and an ethylene-butyl acrylate copolymer.

In the present invention, it is preferable for such a primary film layer to consist of a uniaxially-stretched sheet or a biaxially stretched sheet. In the primary film layer, in particular, due to the dispersant vesicle obtained by a supercritical reverse phase evaporation method being contained, the inorganic filler is successfully highly dispersed in the primary film layer. Accordingly, sufficient mechanical strength is achieved also when the inorganic filler is densely packed, and, in addition, due to a uniaxially stretched sheet or a biaxially stretched sheet on which uniaxial stretching or biaxial stretching has been performed, it is possible for the primary film layer has greater mechanical strength as a film. Although, when an inorganic filler is densely packed, the resulting film may have depressions and projections on the surface and thus poor smoothness, due to the uniaxially stretched sheet or the biaxially stretched sheet, it is possible for the primary film layer to have excellent film surface smoothness and excellent printability, exerting good inking properties when pattern printing is performed.

Here, in the technical criteria for noncombustible materials specified by the Enforcement Order of the Building Standard Law, it is necessary to satisfy the following requirements in fire testing by a corn calorimeter in accordance with ISO 5660-1 (Article 108bis(1) and (2) of the Enforcement Order of the Building Standard Law). In order for the decorated sheet of the present invention to be certified as a noncombustible material, the decorated sheet in the state of being laminated with a noncombustible substrate needs to satisfy all of the following requirements 1 to 3 when heated for a heating time of 20 min by a radiant heat of 50 kW/m$^2$:

1. The total heat released is 8 MJ/m$^2$ or less;
2. The highest heat release rate does not continuously exceed 200 KW/m$^2$ for 10 seconds or more; and
3. Neither a crack nor a hole penetrating to the back surface, which is deleterious to fire prevention, is formed.

The noncombustible substrate can be selected and used from a gypsum board, a fiber-reinforced calcium silicate plate, and a zinc-plated steel plate.

The decorated sheet of the present invention having the above-described primary film layer, in a state of being laminated with a non-combustible substrate, achieves a noncombustible material satisfying requirements set forth in both Article 108bis(1) and (2) of the Enforcement Order of the Building Standard Law in fire testing by a corn calorimeter in accordance with ISO 5660-1.

With such a decorated sheet having a primary film layer containing a nano-sized dispersant, more preferably a dispersant vesicle, and an inorganic filler, it is possible to achieve dense packing of the inorganic filler and to provide a decorated sheet as a "noncombustible material" that satisfies the technical criteria for a noncombustible material set forth in the Enforcement Order of the Building Standard Law. And, as a result of enabling an inorganic filler to be densely packed, it is possible to reduce the proportion of the resin component in the decorated sheet and thus significantly reduce the emissions of carbon dioxide generated during incineration after disposal.

In particular, due to the dispersant vesicle obtained by a supercritical reverse phase evaporation method being contained, the inorganic filler can be highly dispersed by preventing it from aggregating in the resin composition, and therefore it is possible for the decorated sheet to have excellent mechanical strength and post-processing resistance. Moreover, by using a uniaxially stretched sheet or a biaxially stretched sheet for the primary film layer, it is possible for the primary film layer to have smoothness and high mechanical strength.

Below, commonly used configurations of various decorated sheets will now be described with reference to FIGS. 1 to 5.

FIG. 1 is one example of a single-layer decorated sheet. In FIG. 1, a decorated sheet 10 is a decorated sheet configured such that a pattern layer 2 and a concealing layer 3 are provided on one surface of a transparent resin layer 1 (a transparent resin sheet), one surface or both surfaces of which are activated by corona treatment, plasma treatment, electron beam treatment, ultraviolet treatment, dichromate treatment, or the like as necessary, and a top coat layer 4 is provided on the other surface of the transparent resin layer 1. If adhesion of the concealing layer 3 to the substrate (a substrate on which the decorated sheet 10 is laminated, such as a wooden board, an inorganic board, or a metal plate) is problematic, a primer layer 5 may be suitably provided as well. In order to enhance aesthetics, an emboss design 1a may be suitably provided on the surface of the transparent resin layer 1 on the top coat layer 4 side.

The emboss design 1a of the configuration of FIG. 1 is directly provided on, for example, a highly crystalline polypropylene sheet as the transparent resin layer 1, and examples of methods therefor include a method in which an emboss design is imparted to the above sheet, which has been formed into a film, by heat and pressure using an embossing plate having a pattern of depressions and projections, and a method in which emboss is provided simultaneously with cooling using a chill roll having a pattern of depressions and projections when forming a film using an extruder. Here, it is also possible to enhance aesthetics by filling the emboss design 1*a* as an embossed part with ink.

The method for molding a sheet of the transparent resin layer 1 consisting of a highly crystalline polypropylene sheet is not particularly limited as long as a film can be formed, and a method that involves an extruder is most common. In the method for forming the transparent resin layer 1, a highly crystalline polypropylene resin mixed with an additive is heated, so the highly crystalline polypropylene resin melts. Thereafter, the molten highly crystalline polypropylene resin is molded into a film by a molding machine and cooled. The crystal growth of the highly crystalline polypropylene resin due to a nucleating agent occurs in the above cooling step.

In FIG. 1, as a method for providing the pattern layer 2 and the concealing layer 3, there is a method in which direct gravure printing, offset printing, screen printing, flexographic printing, electrostatic printing, ink-jet printing, or the like is performed on the transparent resin layer 1 consisting of a highly crystalline polypropylene sheet.

When providing the concealing layer 3 in particular, a comma coater, knife coater, lip coater, metal vapor deposition, or sputtering method may be used. The method for providing the top coat layer 4 is the same as the method for providing the concealing layer 3, the pattern layer 2, and the like and is not limited in any way.

Various additives such as a heat stabilizer, a flame retardant, an ultraviolet absorber, a light stabilizer, an antiblocking agent, a catalyst scavenger and, as long as the features of the present invention are not impaired, a coloring agent, a light scattering agent, and a lust conditioner can also be added as necessary to the transparent resin layer 1 composed of a highly crystalline polypropylene sheet used here.

It is common to add phenol, sulfur, phosphorous, hydrazine, and the like as heat stabilizers, aluminum hydroxide, magnesium hydroxide, and the like as flame retardants, benzotriazole, benzoate, benzophenone, triazine, and the like as ultraviolet absorbers, and hindered amine and the like as light stabilizers in any combination. In particular, when used in the present application, it is necessary to take weather resistance into consideration, an ultraviolet absorber and a light stabilizer are essential, and a suitable amount of each added is 0.1 to 1.0% by weight based on 100% by weight of the transparent resin layer 1.

When ink is used in the pattern layer 2, a binder is suitably selected from nitrocellulose, cellulose, a vinyl chloride-vinyl acetate copolymer, polyvinyl butyral, polyurethane, acryl, polyester, or the like as-is or each as a modified product. None of aqueous, solvent (oil-based), and emulsion types of these pose problems, and a one-component type and a two-component type in which a curing agent is used can be selected arbitrarily. Moreover, it is also possible to cure ink by irradiation of ultraviolet rays, electron beams, or the like.

The most common method of all is a method in which urethane ink is used and cured by isocyanate. Other than these binders, coloring agents such as pigments and dyes, extenders, solvents, and various additives contained in ordinary ink are added. Pigments particularly often used are condensed azo, insoluble azo, quinacridone, isoindoline, anthraquinone, imidazolone, cobalt, phthalocyanine, carbon, titanium oxide, iron oxide, mica and such pearlescent pigments, and the like. Besides the application of ink, it is also possible to provide a design by vapor deposition or sputtering of various metals.

While the material used for the concealing layer 3 is basically the same as the pattern layer 2, since it is necessary to provide concealing characteristics as a purpose, a non-transparent pigment, titanium oxide, iron oxide, or the like is used as a pigment. In order to enhance concealing characteristics, it is also possible to add a metal such as gold, silver, copper, or aluminum. In general, flaky aluminum is often added. As for the thickness of the concealing layer 3 applied, concealing characteristics are unlikely to be imparted when 2 µm or less, the cohesive force of the resin layer is weak when 10 µm or more, and therefore 2 µm to 10 µm is reasonable.

The top coat layer 4 is obtained by applying a resin material or a resin composition and, as necessary, drying and curing the coating film. The material used for the top coat layer 4 is also not particularly limited, and can be suitably selected from polyurethane, acryl, acrylic silicone, fluorine, epoxy, vinyl, polyester, melamine, aminoalkyd, urea, and the like. Any of the aqueous, emulsion, and solvent (oil-based) forms is possible, and also with respect to curing, both a one-component type and a two-component type using a curing agent may be selected. In particular, a urethane top coat that utilizes an isocyanate reaction is desirable also from the viewpoint of workability, price, cohesive force of the resin itself, and the like.

Isocyanate can be suitably selected from curing agents such as tolylene diisocyanate (TDI), xylylene diisocyanate (XDI), hexamethylene diisocyanate (HMDI), diphenylmethane diisocyanate (MDI), lysine diisocyanate (LDI), isophorone diisocyanate (IPDI), hydrogenated tolylene diisocyanate (HTDI), hydrogenated xylylene diisocyanate (HXDI), trimethyl hexamethylene diisocyanate (TMDI), and derivatives (adducts, biurets, isocyanurates) and various prepolymers thereof. In consideration of weather resistance, it is preferable to use a curing agent based on hexamethylene diisocyanate (HMDI) that have a linear molecular structure, or isophorone diisocyanate (IPDI).

In order to further enhance the hardness of the surface of the decorated sheet, it is also possible to use a resin that is cured by ultraviolet or electron beam irradiation as the top coat layer 4. Moreover, in order to enhance weather resistance, an ultraviolet absorber and a light stabilizer may be suitably added. In order to impart various functions, functional additives such as bactericidal agents and antifungal agents can be also added arbitrarily. Moreover, in order to adjust luster for the aesthetics of the surface or, moreover, in order to impart wear resistance, alumina, silica, silicon nitride, silicon carbide, glass beads, and the like can also be added arbitrarily. A thickness of the top coat layer 4 applied of 2 µm to 10 µm is normally reasonable.

While the material used for the primer layer 5 is basically the same as the pattern layer 2 and the concealing layer 3, in consideration of rewinding in a web form because the primer layer 5 is provided on the back surface of the decorated sheet, an inorganic filler such as silica, alumina, magnesia, titanium oxide, or barium sulfate may be added in order to avoid blocking and increase adhesion to an adhesive. A thickness of the primer layer 5 applied of 0.1 µm to 3.0 µm is reasonable because the purpose is to ensure adhesion to the substrate.

Figure 2:
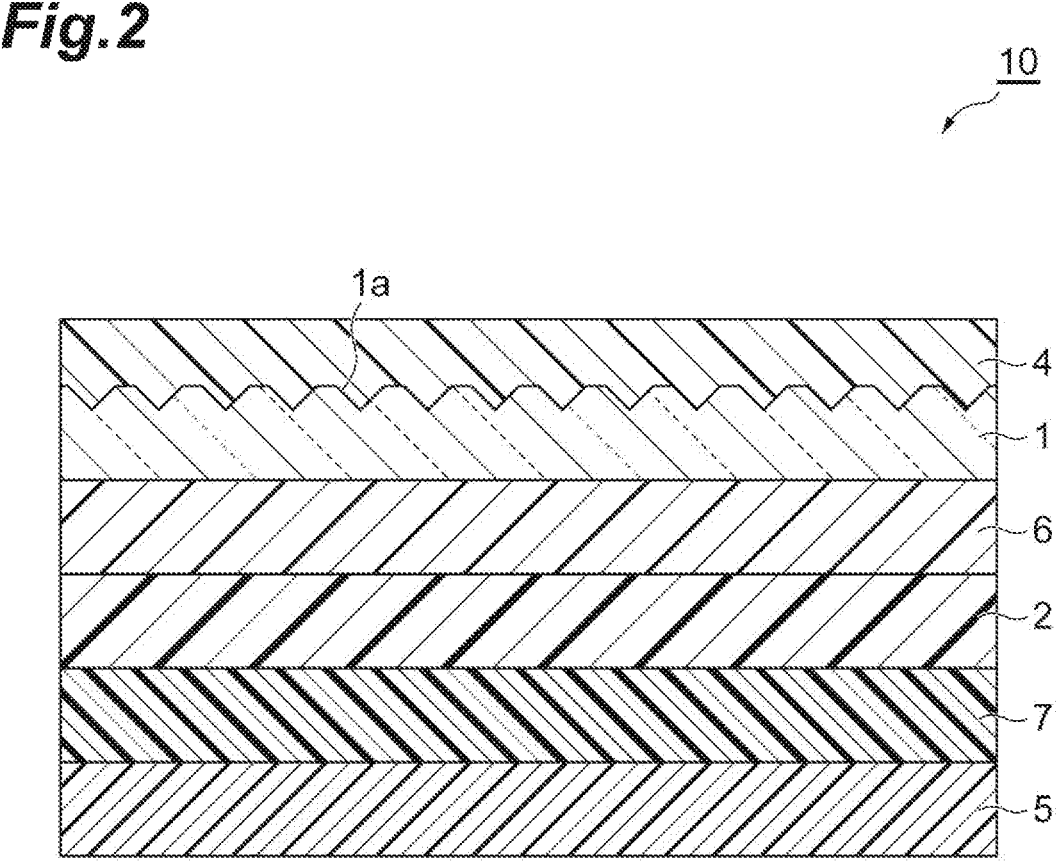
FIG. 2 is a cross-sectional view showing the first to sixth embodiments of the decorated sheet of the present invention.

FIG. 2 shows one example of a configuration of a layered type including a variety of the primary film layer 7 provided with a pattern and the transparent resin layer 1 composed of highly crystalline polypropylene. Here, the layering method and the number of transparent resin layers can be selected arbitrarily.

In the decorated sheet 10 shown in FIG. 2, the top coat layer 4, the transparent resin layer 1, the adhesive layer 6 (consisting of a heat sensitive adhesive layer, an anchor coat layer, a dry laminate adhesive layer, or the like), the pattern layer 2, the primary film layer 7, and the primer layer 5 are layered in order from the page top.

Here, the top coat layer 4 and the emboss design 1a are provided as necessary, and while the primer layer 5 as well is necessary when the surface of the primary film layer 7 is inactive as with olefin materials, it is not necessary when the surface of a substrate is active.

When a substrate, the surface of which is inactive, such as an olefin primary film layer is used as the primary film layer 7, it is desirable to perform corona treatment, plasma treatment, ozone treatment, electron beam treatment, ultraviolet treatment, dichromate treatment, or the like on the front and back of the primary film layer 7. A primer layer may be provided also between the primary film layer 7 and the pattern layer 2 in order to ensure adhesion. When it is desired to impart concealing properties to the decorated sheet 10, a colored sheet having concealing properties may be used as the primary film layer 7, or the concealing layer 3 may be provided.

The primary film layer 7 can be selected arbitrarily from papers such as tissue paper, titanium paper, and resin impregnated paper, synthetic resins such as polyethylene, polypropylene, polybutyrene, polystylene, polycarbonate, polyester, polyamide, an ethylene-vinyl acetate copolymer, polyvinyl alcohol, and acryl, or foamed products of these synthetic resins, rubbers such as ethylene-propylene copolymer rubber, ethylene-propylene-diene copolymer rubber, styrene-butadiene copolymer rubber, styrene-isoprene-styrene block copolymer rubber, styrene-butadiene-styrene block copolymer rubber and polyurethane, organic or inorganic non-woven fabrics, synthetic papers, metal foils of aluminum, iron, gold, and silver, and the like. The primary film layer 7 may be a sheet consisting of the same resin composition as the transparent resin layer 1. The primary film layer 7 is obtained by molding a resin material or a resin composition into a film. Examples of the molding method include calendaring and extrusion.

In the configuration of FIG. 2, the transparent resin layer 1, the pattern layer 2, the top coat layer 4, and the primer layer 5 may be the same as those of FIG. 1.

As for the adhesive layer 6, a material can be selected arbitrarily for an adhering method, there are layering methods by heat lamination, extrusion lamination, dry lamination, and the like, and an adhesive can be selected from acryl, polyester, polyurethane, and like materials. Normally, a urethane material of a two-component curable type that utilizes a reaction between isocyanate and polyol is desirable from the cohesive force thereof.

The layering method also is not particularly limited, and a method in which thermal pressure is applied, an extrusion lamination method, a dry lamination method, or the like is commonly used. When an emboss design is provided, there are a method in which a sheet once laminated by a variety of methods is later embossed by thermal pressure, and a method in which a chill roll is provided with a pattern of depressions and projections, and emboss is provided simultaneously with extrusion lamination.

Also, there is a method in which the transparent resin layer 1 embossed simultaneously with extrusion and the primary film layer 7 are laminated together by heat or dry lamination. The positions where the pattern layer 2 and the adhesive layer 6 are provided may be on the primary film layer 7 side as usual, or may be on the transparent resin layer 1 side.

Moreover, in FIG. 2, when the emboss design 1a is provided on the surface of the transparent resin layer 1 on the top coat layer 4 side, it is also possible to fill the emboss design with ink to enhance aesthetics.

Figure 3:
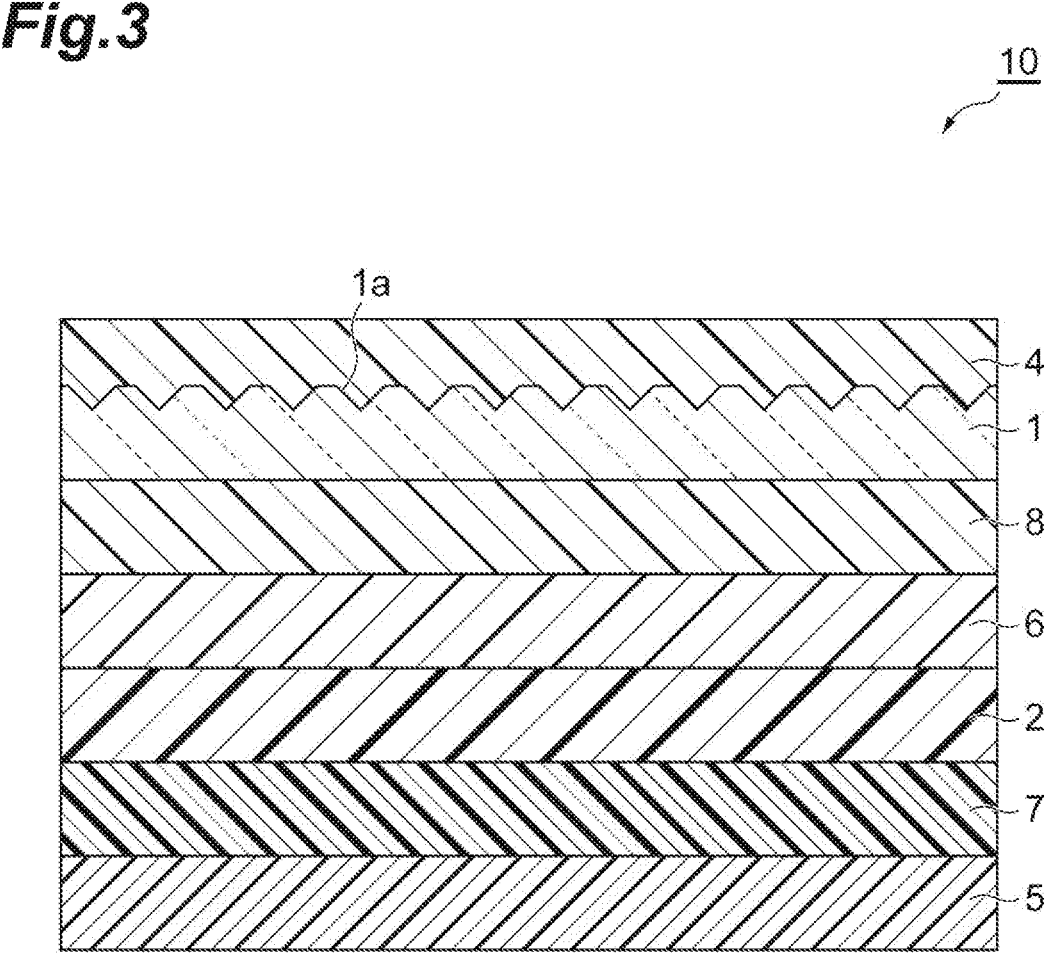
FIG. 3 is a cross-sectional view showing the first to sixth embodiments of the decorated sheet of the present invention.

FIG. 3 shows one example of the configuration of the decorated sheet 10 of a layered type that is different from FIG. 2. While the primer layer 5, the primary film layer 7, the pattern layer 2, the transparent resin layer 1, the top coat layer 4, the adhesive layer 6, and the like are completely the same as those of FIG. 2, the difference is in that an adhering resin layer 8 is provided between the adhesive layer 6 and the transparent resin layer 1. This is done particularly when further lamination strength is sought after by an extrusion lamination method, and lamination is performed by co-extrusion of the transparent resin layer 1 and the adhering resin layer 8.

It is desirable that the adhering resin layer 8 be obtained by acid-modifying a resin such as polypropylene, polyethylene, or acryl, and the thickness be 2 μm or more in order to enhance adhesion. When the thickness is excessive, the softness of the adhering resin layer 8 itself exerts an adverse effect despite the surface hardness enhanced by the highly crystalline transparent resin layer 1, and therefore it is desirable that the thickness be 20 μm or less.

In terms of weather resistance, there is also a method in which weather resistance is imparted to the top coat layer 4 and the transparent resin layer 1 as described above in order to protect the transparent resin layer 1 as a substrate, and, in addition, there is also a method in which an ultraviolet absorber and a light stabilizer are added to the adhesive layer 6 in order to protect the pattern layer 2.

Figure 5:
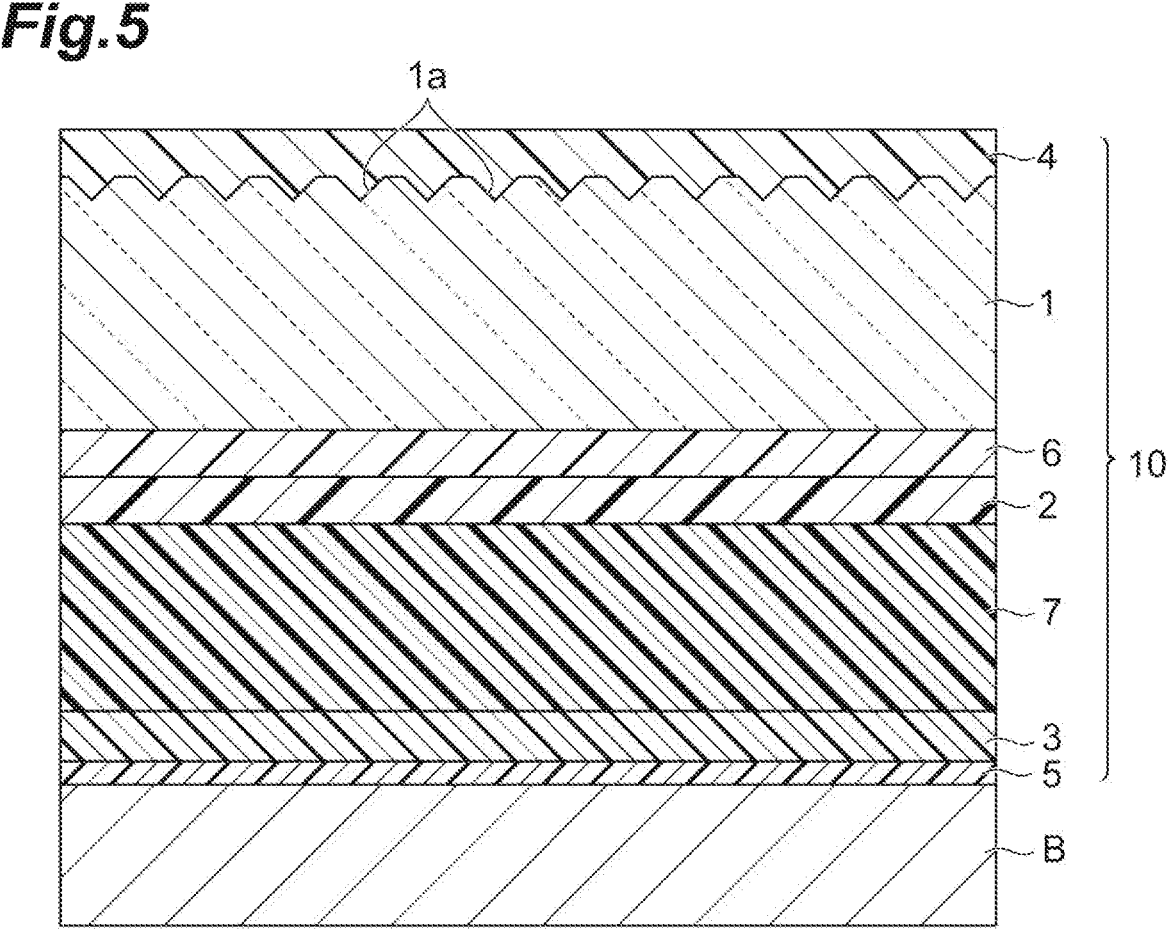
FIG. 5 is a cross-sectional view showing an aspect of the decorated sheet of the seventh embodiment of the present invention laminated with a substrate.

FIG. 5 is a schematic cross-sectional view showing a decorated sheet laminated on a substrate, and shows one example of a configuration of the decorated sheet of another layered type of the present invention. In FIG. 5, the decorated sheet 10 is a layered body in which, from the surface layer side, the top coat layer 4, the transparent resin layer 1, the adhesive layer 6 (consisting of a heat sensitive adhesive, an anchor coat, a dry laminate adhesive, or the like), the pattern layer 2, the primary film layer 7, the concealing layer 3, and the primer layer 5 are layered, and is used, for example, after being adhered to a substrate B. The emboss design 1a is formed on the surface of the transparent resin layer 1 on the top coat layer 4 side in order to enhance aesthetics, and is formed such that a part of the resin composition that forms the top coat layer 4 fills the depressions of the emboss design 1a by wiping.

As for the thickness of each layer of the layered types shown in FIGS. 2, 3, and 5, it is desirable that the primary film layer 7 be 30 μm to 150 μm in consideration of printing workability and cost, and the transparent resin layer 1 be 20 μm to 250 μm and more preferably 30 μm to 150 μm in consideration of aesthetics, post-processability, and cost, but the total thickness of the decorated sheet 10 as a layered product needs to be in the range of 80 μm to 250 μm.

As for the embodiments of the decorated sheet of the present invention, the decorated sheets shown in the above FIGS. 1 to 3 and FIG. 5 have aspects referred to as the following first to seventh embodiments.

First Embodiment

An embodiment in which a resin layer containing the above-described nano-sized additive is applied to the transparent resin layer 1, concerning the decorated sheet of any of FIGS. 1 to 3.

Second Embodiment

An embodiment in which a resin layer containing the above-described nano-sized additive is applied to the top coat layer 4, concerning the decorated sheet of any of FIGS. 1 to 3.

Third Embodiment

An embodiment in which a resin layer containing the above-described nano-sized additive is applied to the top coat layer 4 and the transparent resin layer 1, concerning the decorated sheet of any of FIGS. 1 to 3.

Fourth Embodiment

An embodiment in which a resin layer containing the above-described nano-sized additive is applied to the primary film layer 7, concerning the decorated sheet of any of FIGS. 2 and 3.

Fifth Embodiment

An embodiment in which a resin layer containing the above-described nano-sized additive is applied to the primary film layer 7 and the transparent resin layer 1, concerning the decorated sheet of any of FIGS. 2 and 3.

Sixth Embodiment

An embodiment in which a resin layer containing the above-described nano-sized additive is applied to the transparent resin layer 1, the top coat layer 4, and the primary film layer 7, concerning the decorated sheet of any of FIGS. 2 and 3.

Seventh Embodiment

An embodiment in which a resin layer containing the above-described crystalline polypropylene resin having an average particle size of spherulites of the crystal part of 2000 nm or less is applied to the transparent resin layer 1, concerning the decorated sheet of FIG. 5.

According to the invention of the first embodiment, a decorated sheet can be provided that has the transparent resin layer 1 having high transparency and excellent surface abrasion resistance and post-processing resistance. In the first embodiment, it is preferable for the transparent resin layer 1 to contain 90 to 100% by weight of a crystalline polypropylene resin as a main component and a nucleating agent as a nano-sized additive.

According to the invention of the second embodiment, a decorated sheet can be provided that has the top coat layer 4 having high transparency and excellent surface abrasion resistance and post-processing resistance. In the second embodiment, it is preferable for the top coat layer 4 to contain inorganic fine particles and a dispersant as a nano-sized additive, and contain 0.1 to 30 parts by weight of the inorganic fine particles based on 100 parts by weight of the main-component resin material.

According to the invention of the third embodiment, a decorated sheet can be provided that has excellent transparency of transparent layers consisting of the top coat layer 4 and the transparent resin layer 1 of the decorated sheet and excellent surface abrasion resistance and post-processing resistance of the surface of the decorated sheet. The material of the primary film layer 7 is not particularly limited.

According to the invention of the fourth embodiment, a decorated sheet can be provided that satisfies the technical criteria for a noncombustible material, has excellent mechanical strength and post-processing resistance as a film, and even the carbon dioxide emissions of which can be reduced when disposed of. In the fourth embodiment, it is preferable that the primary film layer 7 be a layer consisting of a thermoplastic resin composition containing a polyolefin resin, an inorganic filler, and a dispersant as a nano-sized additive, and in the thermoplastic resin composition, 50 to 900 parts by weight of the inorganic filler be blended based on 100 parts by weight of the polyolefin resin.

Figure 4:
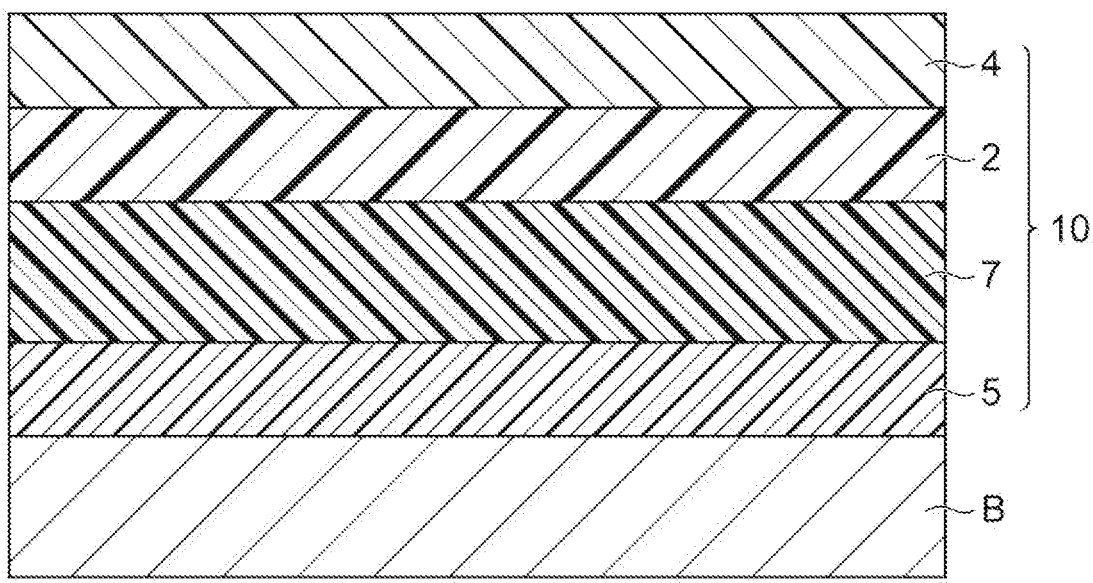
FIG. 4 is a cross-sectional view showing an aspect of the decorated sheet of the fourth and fifth embodiments of the present invention laminated with a substrate.

According to the decorated sheets of the fourth and fifth embodiments, a decorated sheet consisting of a noncombustible material can be provided. In the fourth and fifth embodiments, when abrasion resistance required of the decorated sheet is provided by the top coat layer 4, a configuration excluding the transparent resin layer 1 may be adopted as shown in FIG. 4.

According to the decorated sheet of the sixth embodiment, a decorated sheet can be provided that has excellent transparency of the transparent resin layer and surface abrasion resistance and post-processing resistance of the decorated sheet surface and, also, consists of a noncombustible material.

According to the invention of the seventh embodiment, a decorated sheet can be provided that has excellent abrasion resistance and excellent V-groove bending processability. In the seventh embodiment, it is preferable that the transparent resin layer 1 be obtained from a resin composition containing as a main component 90 to 100% by weight of a crystalline polypropylene resin having an isotactic pentad fraction (mmmm fraction) of 95% or more, and spherulites of the crystal part of the crystalline polypropylene resin in the transparent resin layer 1 have an average particle size of 2000 nm or less.

EXAMPLES

Hereinbelow, specific examples of a decorated sheet of the present invention are studied.

Example 1

In Example 1, a decorated sheet of the embodiment 1 in the configuration of FIG. 1 was produced. Specifically, to a highly crystalline homopolypropylene resin having an isotactic pentad fraction of 97.8%, an MFR (melt flow rate) (230° C.) of 15 g/10 min, and a molecular weight distribution MWD (Mw/Mn) of 2.3 were added 500 ppm of a hindered phenol based anti-oxidant (Irganox 1010: manufactured by BASF SE), 2000 ppm of a benzotriazole based ultraviolet absorbent (Tinuvin 328: manufactured by BASF SE), 2000 ppm of a hindered amine based light stabilizer (Chimassorb 944: manufactured by BASF SE), and 1000 ppm of sodium 2,2'-methylenebis(4,6-di-tert-butylphenyl) phosphonate nano-treated by a solid phase process, and this resin was extruded using a melt extruding machine to film-form a transparent resin sheet with a thickness of 100 μm made from highly crystalline polypropylene for use as a transparent resin layer 1. Subsequently, both surfaces of the film-formed transparent resin sheet underwent corona treatment to achieve a wetting tension on the surfaces of 40 dyn/cm or more. Note that, by the control of cooling conditions during extrusion film-forming, the haze value of the crystalline polypropylene resin in the film-formed transparent resin sheet attained to 8.5%.

To one surface of the transparent resin layer 1 of the resulting transparent resin sheet, pattern printing was performed by a two-component curable type urethane ink (V180: manufactured by TOYO Ink Manufacturing Co., Ltd.) to provide a pattern layer 2, and then, onto the pattern layer 2, a two-component curable type urethane ink (V180: manufactured by TOYO Ink Manufacturing Co., Ltd.) possessing concealing properties was applied in an amount applied of 6 g/m$^2$ to provide a concealing layer 3.

Also, onto this concealing layer 3, a two-component curable type urethane ink (PET-E, Reducer: manufactured by Dainichiseika Color & Chemicals Mfg. Co., Ltd.) was applied as a primer coat in an amount applied of 1 g/m$^2$ to form a primer layer 5.

Next, by press working using a metal mold roll for embossment, an emboss design 1a was provided on a surface of the transparent resin layer 1 of the transparent resin sheet in this sheet, and then, a two-component curable type urethane top coat (W184: manufactured by DIC Graphics Corporation) was applied on that emboss design 1a surface in an amount applied of 3 g/m$^2$ to obtain a decorated sheet with a total thickness of 110 μm shown in FIG. 1.

Example 2

In Example 2, a decorated sheet of the embodiment 1 in the configuration of FIG. 2 was produced. Specifically, to a highly crystalline homopolypropylene resin having an isotactic pentad fraction of 97.8%, an MFR (melt flow rate) (230° C.) of 15 g/10 min, and a molecular weight distribution MWD (Mw/Mn) of 2.3 were added 500 ppm of a hindered phenol based anti-oxidant (Irganox 1010: manufactured by BASF SE), 2000 ppm of a benzotriazole based ultraviolet absorbent (Tinuvin 328: manufactured by BASF SE), 2000 ppm of a hindered amine based light stabilizer (Chimassorb 944: manufactured by BASF SE), and 1000 ppm of sodium 2,2'-methylenebis(4,6-di-tert-butylphenyl)phosphonate nano-treated by a crystallization process, and this resin was extruded using a melt extruding machine to film-form a transparent resin sheet with a thickness of 80 μm made from highly crystalline polypropylene for use as a transparent resin layer 1. Subsequently, both surfaces of the film-formed transparent resin sheet underwent corona treatment to achieve a wetting tension on the surfaces of 40 dyn/cm or more. Note that, by the control of cooling conditions during extrusion film-forming, the haze value of crystalline polypropylene resin in the film-formed transparent resin sheet attained to 6.8%.

On the other hand, to a primary film layer 7 with a thickness of 70 μm possessing concealing properties, pattern printing was carried out by a two-component curable type urethane ink (V180: manufactured by TOYO Ink Manufacturing Co., Ltd.) to provide a pattern layer 2, and also, the backside of the primary film layer 7 was provided with a primer coat in a similar way to Example 1 to provide a primer layer 5. After this, a surface of the pattern layer 2 on the primary film layer 7 was laminated with the transparent resin layer 1 of the transparent resin sheet made from highly crystalline polypropylene via an adhesive layer 6 based on an adhesive for dry lamination (TAKELAC A540: manufactured by Mitsui Chemicals, Inc.; amount applied of 2 g/m$^2$) by a dry lamination process. Next, by press working using a metal mold roll for embossment, an emboss design 1a was provided on a surface of the transparent resin layer 1 of the transparent resin sheet in the laminated sheet, and then, a two-component curable type urethane top coat (W184: manufactured by DIC Graphics Corporation) was applied on that emboss design 1a surface in an amount applied of 3 g/m$^2$ to obtain a decorated sheet with a total thickness of 154 μm shown in FIG. 2.

Example 3

In Example 3, a decorated sheet of the embodiment 1 in the configuration of FIG. 3 was produced. Specifically, to a primary film layer 7 with a thickness of 70 μm possessing concealing properties, pattern printing was carried out by a two-component curable type urethane ink (V180: manufactured by TOYO Ink Manufacturing Co., Ltd.) to provide a pattern layer 2, and also, the backside of the primary film layer 7 was provided with a primer coat in a similar way to Example 1 to provide a primer layer 5.

On the other hand, to a highly crystalline homopolypropylene resin having an isotactic pentad fraction of 97.8%, an MFR (melt flow rate) (230° C.) of 15 g/10 min, and a molecular weight distribution MWD (Mw/Mn) of 2.3 were added 500 ppm of a hindered phenol based anti-oxidant (Irganox 1010: manufactured by BASF SE), 2000 ppm of a benzotriazole based ultraviolet absorbent (Tinuvin 328: manufactured by BASF SE), 2000 ppm of a hindered amine based light stabilizer (Chimassorb 944: manufactured by BASF SE), and 1000 ppm of sodium 2,2'-methylenebis(4,6-di-tert-butylphenyl)phosphonate nano-treated by a crystallization process, and this resin was coextruded with a polyethylene based easily-adherable resin using a melt extruding machine to film-form a transparent resin sheet with a thickness of 80 μm made from highly crystalline polypropylene for use as a transparent resin layer 1 and an adherable resin layer 8. A surface of the pattern layer 2, to which an aromatic ester based anchoring agent (A3210: manufactured by Mitsui Chemicals, Inc.; amount applied of 1 g/m$^2$) as an adhesive layer 6 was applied, on the primary film layer 7 was laminated with the transparent resin layer 1 of the transparent resin sheet made from highly crystalline polypropylene by an extrusion lamination process via the adherable resin layer 8. Note that, by the control of cooling conditions during coextrusion film-forming, the haze value of crystalline polypropylene resin in the film-formed transparent resin sheet attained to 8.3%.

Next, by press working using a metal mold roll for embossment, an emboss design 1a was provided on a surface of the transparent resin layer 1 of the transparent resin sheet in the laminated sheet, and then, on that emboss design 1a surface, a two-component curable type urethane top coat (W184: manufactured by DIC Graphics Corporation) was applied in an amount applied of 3 g/m$^2$ to obtain a decorated sheet with a total thickness of 155 μm shown in FIG. 3.

Comparative Example 1

In the above Example 1, a decorated sheet was obtained by a similar method to Example 1, except that 1000 ppm of sodium 2,2'-methylenebis(4,6-di-tert-butylphenyl)phosphonate without nano treatment applied was added. Note that, by the control of cooling conditions during extrusion film-forming, the haze value of crystalline polypropylene resin in the film-formed transparent resin sheet attained to 18.3%.

Comparative Example 2

In the above Example 2, a decorated sheet was obtained by a similar method to Example 2, except that 1000 ppm of sodium 2,2'-methylenebis(4,6-di-tert-butylphenyl)phosphonate without nano treatment applied was added. Note that, by the control of cooling conditions during extrusion film-forming, the haze value of crystalline polypropylene resin in the film-formed transparent resin sheet attained to 17.1%.

Comparative Example 3

In the above Example 1, a decorated sheet was obtained by a similar method to Example 1, except that a nucleating agent was not added. Note that, by the control of cooling conditions during extrusion film-forming, the haze value of crystalline polypropylene resin in the film-formed transparent resin sheet attained to 1.8%.

Each decorated sheet obtained in the above Examples 1 to 3 and the above Comparative Examples 1 to 3 was laminated with a wooden substrate using a urethane based adhesive, and then, the surface hardness determined in a pencil hardness test and the presence or absence of V-groove bending processability determined in a V-groove bending test were each evaluated. The evaluation results are shown in the following Table 1. Note that the V-groove bending test was conducted under conditions of high-speed folding at low temperatures so as not to depend on a processing machine or an environment during processing. The item of "V-cut" in Table 1 shows the evaluation results of V-groove bending processabilities. The evaluation criteria in the V-groove bending test are as follows.

○: Excellent in V-groove bending processability.

X: Crack occurred.

TABLE 1

| Item | Haze value [%] | Tensile elastic modulus [MPa] | Tensile breaking elongation [%] | Pencil hardness | V-cut |
|---|---|---|---|---|---|
| Example 1 | 8.5 | 1520 | 310 | H | ○ |
| Example 2 | 6.8 | 1125 | 425 | H | ○ |
| Example 3 | 8.3 | 1480 | 320 | H | ○ |
| Comparative Example 1 | 18.3 | 1430 | 70 | H | X |
| Comparative Example 2 | 17.1 | 1050 | 98 | H | X |
| Comparative Example 3 | 1.8 | 710 | 550 | 3B | ○ |

As is apparent from Table 1, it can be said that, in comparison to the decorated sheets according to conventional Comparative Examples 1 and 2, the decorated sheets according to Examples 1 to 3 using highly crystalline polypropylene to which a nano-treated nucleating agent of the present invention was added are decorated sheets that have high transparencies, and are excellent in abrasion resistances and V-groove bending processabilities. Further, the decorated sheet according to Comparative Example 3 has a high transparency, but has a result of a significantly poor abrasion resistance.

Example 4

<Nano Treatment of a Nucleating Agent Using a Supercritical Reverse Phase Evaporation Method>

First of all, in a nano treatment method of a nucleating agent using a supercritical reverse phase evaporation method in the present Example, 100 parts by weight of methanol, 82 parts by weight of a phosphoric acid ester metal salt based nucleating agent (Adekastab NA-11, manufactured by ADEKA Corporation), and 5 parts by weight of phosphatidylcholine are placed into a high pressure stainless vessel kept at 60° C. followed by tightly closing, and carbon dioxide is injected so as to achieve a pressure of 20 MPa for a supercritical state, and then, with vigorous stirring and mixing, 100 parts by weight of ion-exchanged water is injected. After stirring for 15 minutes in a state where the temperature and pressure in the vessel are held, carbon dioxide is discharged to recover the atmospheric pressure, by which a nucleating agent vesicle comprising the nucleating agent and an outer membrane consisting of a phospholipid within which the nucleating agent is encapsulated is obtained.

In Example 4 of a decorated sheet of the present invention, a decorated sheet of the embodiment 1 in the configuration of FIG. 1 was produced. Specifically, to a highly crystalline homopolypropylene resin having an isotactic pentad fraction of 97.8%, an MFR (melt flow rate) (230° C.) of 15 g/10 min, and a molecular weight distribution MWD (Mw/Mn) of 2.3 were added 500 ppm of a hindered phenol based anti-oxidant (Irganox 1010: manufactured by BASF SE), 2000 ppm of a benzotriazole based ultraviolet absorbent (Tinuvin 328: manufactured by BASF SE), 2000 ppm of a hindered amine based light stabilizer (Chimassorb 944: manufactured by BASF SE), and 1000 ppm of a phosphoric acid ester metal salt based nucleating agent (Adekastab NA-21: manufactured by ADEKA Corporation) vesiculated by the previously described supercritical reverse phase evaporation method, and this resin was extruded using a melt extruding machine to film-form a transparent resin sheet with a thickness of 100 μm made from highly crystalline polypropylene for use as a transparent resin layer 1. Subsequently, both surfaces of the film-formed transparent resin sheet underwent corona treatment to achieve a wetting tension on the surfaces of 40 dyn/cm or more. Note that, by the control of cooling conditions during extrusion film-forming, the haze value of crystalline polypropylene resin in the film-formed transparent resin sheet attained to 8.5%.

To one surface of the transparent resin layer 1 of the resulting transparent resin sheet, pattern printing was performed by a two-component curable type urethane ink (V180: manufactured by TOYO Ink Manufacturing Co., Ltd.) to provide a pattern layer 2, and then, onto the pattern layer 2, a two-component curable type urethane ink (V180: manufactured by TOYO Ink Manufacturing Co., Ltd.) possessing concealing properties was applied in an amount applied of 6 g/m² to provide a concealing layer 3.

Also, onto this concealing layer 3, a two-component curable type urethane ink (PET-E, Reducer: manufactured by Dainichiseika Color & Chemicals Mfg. Co., Ltd.) was applied as a primer coat in an amount applied of 1 g/m² to form a primer layer 5.

Next, by press working using a metal mold roll for embossment, an emboss design 1a was provided on a surface of the transparent resin layer 1 of the transparent resin sheet in this sheet, and then, on that emboss design 1a surface, a two-component curable type urethane top coat (W184: manufactured by DIC Graphics Corporation) was applied in an amount applied of 3 g/m² to obtain a decorated sheet with a total thickness of 110 μm shown in FIG. 1.

Example 5

In Example 5, a decorated sheet of the embodiment 1 in the configuration of FIG. 2 was produced. Specifically, to a highly crystalline homopolypropylene resin having an isotactic pentad fraction of 97.8%, an MFR (melt flow rate) (230° C.) of 15 g/10 min, and a molecular weight distribution MWD (Mw/Mn) of 2.3 were added 500 ppm of a hindered phenol based anti-oxidant (Irganox 1010: manufactured by BASF SE), 2000 ppm of a benzotriazole based ultraviolet absorbent (Tinuvin 328: manufactured by BASF SE), 2000 ppm of a hindered amine based light stabilizer (Chimassorb 944: manufactured by BASF SE), and 1000 ppm of a phosphoric acid ester metal salt based nucleating agent (Adekastab NA-21: manufactured by ADEKA Corporation) vesiculated by the supercritical reverse phase evaporation method previously described in Example 4, and this resin was extruded using a melt extruding machine to film-form a transparent resin sheet with a thickness of 80 μm made from highly crystalline polypropylene for use as a transparent resin layer 1. Subsequently, both surfaces of the film-formed transparent resin sheet underwent corona treatment to achieve a wetting tension on the surfaces of 40 dyn/cm or more. Note that, by the control of cooling conditions during extrusion film-forming, the haze value of crystalline polypropylene resin in the film-formed transparent resin sheet attained to 6.8%.

On the other hand, to a primary film layer 7 with a thickness of 70 μm possessing concealing properties, pattern printing was carried out by a two-component curable type urethane ink (V180: manufactured by TOYO Ink Manufacturing Co., Ltd.) to provide a pattern layer 2, and also, the backside of the primary film layer 7 was provided with a primer coat in a similar way to Example 4 to provide a primer layer 5. After this, a surface of the pattern layer 2 on the primary film layer 7 was laminated with the transparent resin layer 1 of the transparent resin sheet made from highly crystalline polypropylene via an adhesive layer 6 based on an adhesive for dry lamination (TAKELAC A540: manufactured by Mitsui Chemicals, Inc.; amount applied of 2 g/m²) by a dry lamination process. Next, by press working using a metal mold roll for embossment, an emboss design 1a was provided on a surface of the transparent resin layer 1 of the transparent resin sheet in the laminated sheet, and then, on that emboss design 1a surface, a two-component curable type urethane top coat (W184: manufactured by DIC Graphics Corporation) was applied in an amount applied of 3 g/m² to obtain a decorated sheet with a total thickness of 154 μm shown in FIG. 2.

Example 6

In Example 6, a decorated sheet of the embodiment 1 in the configuration of FIG. 3 was produced. Specifically, to a primary film layer 7 with a thickness of 70 μm possessing concealing properties, pattern printing was carried out by a two-component curable type urethane ink (V180: manufactured by TOYO Ink Manufacturing Co., Ltd.) to provide a pattern layer 2, and also, the backside of the primary film layer 7 was provided with a primer coat in a similar way to Example 4 to provide a primer layer 5.

On the other hand, to a highly crystalline homopolypropylene resin having an isotactic pentad fraction of 97.8%, an MFR (melt flow rate) (230° C.) of 15 g/10 min, and a molecular weight distribution MWD (Mw/Mn) of 2.3 were added 500 ppm of a hindered phenol based anti-oxidant (Irganox 1010: manufactured by BASF SE), 2000 ppm of a benzotriazole based ultraviolet absorbent (Tinuvin 328: manufactured by BASF SE), 2000 ppm of a hindered amine based light stabilizer (Chimassorb 944: manufactured by BASF SE), and 1000 ppm of a phosphoric acid ester metal salt based nucleating agent (Adekastab NA-21: manufactured by ADEKA Corporation) vesiculated by the supercritical reverse phase evaporation method previously described in Example 4, and this resin was coextruded with a polyethylene based easily-adherable resin using a melt extruding machine to film-form a transparent resin sheet with a thickness of 80 μm made from highly crystalline polypropylene for use as a transparent resin layer 1 and an adherable resin layer 8. A surface of the pattern layer 2, to which an aromatic ester based anchoring agent (A3210: manufactured by Mitsui Chemicals Inc.; amount applied of 1 g/m²) as an adhesive layer 6 was applied, on the primary film layer 7 was laminated with the transparent resin layer 1 of the transparent resin sheet made from highly crystalline polypropylene via the adherable resin layer 8 by an extrusion lamination process. Note that, by the control of cooling conditions during coextrusion film-forming, the haze value of crystalline polypropylene resin in the film-formed transparent resin sheet attained to 8.3%.

Next, by press working using a metal mold roll for embossment, an emboss design 1a was provided on a surface of the transparent resin layer 1 of the transparent resin sheet in the laminated sheet, and then, on that emboss design 1a surface, a two-component curable type urethane top coat (W184: manufactured by DIC Graphics Corporation) was applied in an amount applied of 3 g/m² to obtain a decorated sheet with a total thickness of 155 μm shown in FIG. 3.

Comparative Example 4

In the above Example 4, a decorated sheet was obtained by a similar method to Example 4, except that 1000 ppm of a phosphoric acid ester metal salt based nucleating agent (Adekastab NA-21: manufactured by ADEKA Corporation) without nano treatment applied was added. Note that, by the control of cooling conditions during extrusion film-forming, the haze value of crystalline polypropylene resin in the film-formed transparent resin sheet attained to 18.3%.

Comparative Example 5

In the above Example 5, a decorated sheet was obtained by a similar method to Example 5, except that 1000 ppm of a phosphoric acid ester metal salt based additive in which a mixture of isopropylalcohol and a phosphoric acid ester metal salt based nucleating agent (Adekastab NA-21: manufactured by ADEKA Corporation) has undergone nano treatment by a solid phase process for 60 minutes by means of a bead mill using 30 μm of stabilized zirconia beads, was added. Note that, by the control of cooling conditions during extrusion film-forming, the haze value of crystalline polypropylene resin in the film-formed transparent resin sheet attained to 17.1%.

Comparative Example 6

In the above Example 4, a decorated sheet was obtained by a similar method to Example 4, except that a nucleating agent was not added. Note that, by the control of cooling conditions during extrusion film-forming, the haze value of crystalline polypropylene resin in the film-formed transparent resin sheet attained to 1.8%.

Each decorated sheet obtained in the above Examples 4 to 6 and the above Comparative Examples 4 to 6 was laminated with a wooden substrate using a urethane based adhesive, and then, the surface hardness determined in a pencil hardness test and the presence or absence of V-groove bending processability determined in a V-groove bending test were each evaluated. The evaluation results are shown in the following Table 2. Note that the V-groove bending test was conducted under conditions of high-speed folding at low temperatures so as not to depend on a processing machine or an environment during processing. The item of "V-cut" in Table 2 shows the evaluation results of V-groove bending processabilities. The evaluation criteria in the V-groove bending test are as follows.
○: Excellent in V-groove bending processability.
X: Crack occurred.

TABLE 2

| Item | Haze value [%] | Tensile elastic modulus [MPa] | Tensile breaking elongation [%] | Pencil hardness | V-cut |
|---|---|---|---|---|---|
| Example 4 | 8.5 | 1520 | 310 | H | ○ |
| Example 5 | 6.8 | 1125 | 425 | H | ○ |
| Example 6 | 8.3 | 1480 | 320 | H | ○ |
| Comparative Example 4 | 18.3 | 1430 | 70 | H | X |
| Comparative Example 5 | 17.1 | 1050 | 98 | H | X |
| Comparative Example 6 | 1.8 | 710 | 550 | 3B | ○ |

As is apparent from Table 2, in comparison to the decorated sheets according to conventional Comparative Example 4 and Comparative Example 5, it can be said that the decorated sheets according to Examples 4 to 6 using highly crystalline polypropylene to which a nucleating agent vesiculated by means of a supercritical reverse phase evaporation method of the present invention was added are decorated sheets that have high transparencies, and are excellent in abrasion resistances and V-groove bending processabilities. Also, the decorated sheet according to Comparative Example 6 has a high transparency, but has a result of a significantly poor abrasion resistance.

Example 7

In Example 7, a decorated sheet of the embodiment 3 in the configuration of FIG. 2 was produced. Specifically, a decorated sheet was made in which, onto a surface of a transparent resin layer 1 to which the following nucleating agent vesicle was added, a top coat layer 4 in which 0.5 parts by weight of the following dispersant vesicle and 5 parts by weight of inorganic fine particles were added to a photo-curable resin was formed.

<Preparation of a Vesicle within which a Dispersant is Encapsulated by a Supercritical Reverse Phase Evaporation Method>

First of all, a detailed preparation method of a dispersant vesiculated by a supercritical reverse phase evaporation method is explained hereinbelow. Firstly, 100 parts by weight of methanol, 70 parts by weight of 3-methacryloxy-propyltrimethoxysilane as an encapsulating-substance forming dispersant, and 5 parts by weight of phosphatidylcholine as a phospholipid composing an outer membrane of a vesicle (outer-membrane forming dispersant) are placed into a high pressure stainless vessel kept at 60° C. followed by tightly closing, and carbon dioxide is injected into the vessel so as to achieve a pressure of 20 MPa for a supercritical state. After this, with vigorous stirring inside the vessel, 100 parts by weight of ion-exchanged water is injected. After stirring and mixing for further 15 minutes with the temperature and pressure kept in the supercritical state, carbon dioxide is discharged from the vessel to recover the atmospheric pressure, by which a dispersant vesicle comprising the dispersants and an outer membrane consisting of a phospholipid within which the dispersants are encapsulated is obtained.

<Preparation of a Resin Composition Composing a Transparent Resin Layer 1>

Hereinbelow, a detailed preparation method of a resin composition in a transparent resin layer 1 to which a nucleating agent vesiculated by a supercritical reverse phase evaporation method is added is explained. First of all, in a vesiculation method of a nucleating agent by a supercritical reverse phase evaporation method, 100 parts by weight of methanol, 82 parts by weight of a phosphoric acid ester metal salt based nucleating agent (Adekastab NA-11, manufactured by ADEKA Corporation), and 5 parts by weight of phosphatidylcholine are placed into a high pressure stainless vessel kept at 60° C. followed by tightly closing, and carbon dioxide is injected so as to achieve a pressure of 20 MPa for a supercritical state, and then, with vigorous stirring and mixing, 100 parts by weight of ion-exchanged water is injected. After stirring for 15 minutes in a state where the temperature and pressure in the vessel are held in the supercritical state, carbon dioxide is discharged to recover the atmospheric pressure, by which a nucleating agent vesicle comprising an outer membrane consisting of a phospholipid within which a nucleating agent is encapsulated is obtained. In practice, when a transparent resin sheet as a transparent resin layer 1 is formed, to a highly crystalline homopolypropylene resin having an isotactic pentad fraction of 97.8%, an MFR (melt flow rate) (230° C.) of 15 g/10 min, and a molecular weight distribution MWD (Mw/Mn) of 2.3 are added 500 ppm of a hindered phenol based anti-oxidant (Irganox 1010: manufactured by BASF SE), 2000 ppm of a benzotriazole based ultraviolet absorbent (Tinuvin 328: manufactured by BASF SE), 2000 ppm of a hindered amine based light stabilizer (Chimassorb 944: manufactured by BASF SE), and 1000 ppm of the previously described nucleating agent vesicle, and this resin is extruded using a melt extruding machine to obtain a transparent resin sheet made from highly crystalline polypropylene for use as a transparent resin layer 1.

The above resin composition composing the transparent resin layer 1 was melt-extruded using an extruding machine to film-form a transparent resin sheet as a highly crystalline polypropylene transparent sheet with a thickness of 80 µm, and both surfaces of the resulting transparent resin sheet underwent corona treatment to achieve a wetting tension on the surfaces of the transparent resin sheet of 40 dyn/cm or more. On the other hand, to one surface of a polyethylene sheet (primary film layer 7) with a thickness of 70 µm possessing concealing properties, using an ink in which 0.5% by weight of a hindered amine based light stabilizing agent (Chimassorb 944; manufactured by BASF SE) was added to a two-component type urethane ink (V180; manufactured by TOYO Ink Manufacturing Co., Ltd.) based on the binder resin content in the two-component type urethane ink, pattern printing was carried out by a gravure printing process to provide a pattern layer 2, and also to provide a primer layer 5 on the other surface of the primary film layer 7. After this, one surface of the primary film layer 7 was laminated with a transparent resin sheet via an adhesive for dry lamination (TAKELAC A540; manufactured by Mitsui Chemicals Inc.; amount applied of 2 g/m²) as an adhesive layer 6 by a dry lamination process. Then, on a surface of the transparent resin sheet, an emboss design 1a was provided, and then, an ink fabricated by blending 0.5 parts by weight of the previously described dispersant vesicle and 5 parts by weight of silica fine particles (SUNSPHERE NP-30; manufactured by AGC Si-Tech Co., Ltd.) with a particle size of 10 μm as inorganic fine particles based on 100 parts by weight of a photo-curable urethane acrylate (UNIDIC 17-824-9; manufactured by DIC Graphics Corporation) was applied in an application thickness of 15 g/m² to form a top coat layer 4 to obtain a decorated sheet of the present invention with a total thickness of 167 μm shown in FIG. 2.

Example 8

In Example 8, a decorated sheet of the embodiment 3 in the configuration of FIG. 2 was produced. Specifically, a decorated sheet was made in which, onto a surface of the transparent resin layer 1 to which the nucleating agent vesicle in Example 7 was added, a top coat layer 4 in which 0.5 parts by weight of the dispersant vesicle in Example 7 and 5 parts by weight of inorganic fine particles were added to a mixed resin of a photo-curable resin and a heat-curable resin was formed.

In Example 7, an ink fabricated by blending 60 parts by weight of a photo-curable urethane acrylate (UNIDIC 17-824-9; manufactured by DIC Graphics Corporation), 40 parts by weight of a two-component curable type urethane top coat (W184; manufactured by DIC Graphics Corporation), 0.5 parts by weight of the dispersant vesicle in Example 7 and 5 parts by weight of silica fine particles (SUNSPHERE NP-30; manufactured by AGC Si-Tech Co., Ltd.) with a particle size of 10 μm as inorganic fine particles was used to form a top coat layer 4 to obtain a decorated sheet of the present invention shown in FIG. 2.

Example 9

In Example 9, a decorated sheet of the embodiment 2 in the configuration of FIG. 2 was produced. Specifically, a decorated sheet was made in which, onto a surface of a transparent resin layer 1 to which the nucleating agent vesicle was not added, a top coat layer 4 in which 0.5 parts by weight of the dispersant vesicle and 5 parts by weight of inorganic fine particles were added to a photo-curable resin was formed.

In Example 7, to a highly crystalline homopolypropylene resin having an isotactic pentad fraction of 97.8%, an MFR (melt flow rate) (230° C.) of 15 g/10 min, and a molecular weight distribution MWD (Mw/Mn) of 2.3 were added 500 ppm of a hindered phenol based anti-oxidant (Irganox 1010: manufactured by BASF SE), 2000 ppm of a benzotriazole based ultraviolet absorbent (Tinuvin 328: manufactured by BASF SE), and 2000 ppm of a hindered amine based light stabilizer (Chimassorb 944: manufactured by BASF SE) were added, and this resin was used to form a transparent resin layer 1 to obtain a decorated sheet of the present invention shown in FIG. 2.

Comparative Example 7

In Comparative Example 7, a decorated sheet was made in which, onto a surface of a transparent resin layer 1 to which the nucleating agent vesicle was added, a top coat layer 4 in which 0.5 parts by weight of a dispersant without nano treatment and 5 parts by weight of inorganic fine particles were added to a photo-curable resin was formed.

Specifically, in Example 7, one surface of a primary film layer 7 was laminated with a transparent resin layer 1 via an adhesive for dry lamination (TAKELAC A540; manufactured by Mitsui Chemicals Inc.; amount applied of 2 g/m²) as an adhesive layer 6 by a dry lamination process and an emboss design 1a was provided on a surface of the transparent resin layer 1, and then, an ink fabricated by blending 0.5 parts by weight of 3-methacryloxypropyltrimethoxysilane (KBM-502; Shin-Etsu Silicone) as a dispersant without nano treatment applied and 5 parts by weight of silica fine particles (SUNSPHERE NP-30; manufactured by AGC Si-Tech Co., Ltd.) with a particle size of 10 μm as inorganic fine particles based on 100 parts by weight of a photo-curable urethane acrylate (UNIDIC 17-824-9; manufactured by DIC Graphics Corporation) was applied in an application thickness of 15 g/m² to form a top coat layer 4 to obtain a decorated sheet shown in FIG. 2.

Comparative Example 8

In Comparative Example 8, a decorated sheet was made in which, onto a surface of a transparent resin layer 1 to which the nucleating agent vesicle in Example 7 was added, a top coat layer 4 in which 0.5 parts by weight of the dispersant vesicle in Example 7 and 0.05 parts by weight of inorganic fine particles were added to a photo-curable resin was formed.

Specifically, in Example 7, an emboss design 1a was provided on a surface of a transparent resin layer 1, and then, an ink fabricated by blending 0.5 parts by weight of the dispersant vesicle previously described in Example 7 and 0.05 parts by weight of silica fine particles (SUNSPHERE NP-30; manufactured by AGC Si-Tech Co., Ltd.) with a particle size of 10 μm as inorganic fine particles based on 100 parts by weight of a photo-curable urethane acrylate (UNIDIC 17-824-9; manufactured by DIC Graphics Corporation) was applied in an application thickness of 15 g/m² to form a top coat layer 4 to obtain a decorated sheet shown in FIG. 2.

Comparative Example 9

In Comparative Example 9, a decorated sheet was made in which, onto a surface of a transparent resin layer 1 to which the nucleating agent vesicle in Example 7 was added, a top coat layer 4 in which 0.5 parts by weight of the dispersant vesicle in Example 7 and 40 parts by weight of inorganic fine particles were added to a photo-curable resin was formed.

Specifically, in Example 7, an emboss design 1a was provided on a surface of a transparent resin layer 1, and then, an ink fabricated by blending 0.5 parts by weight of the dispersant vesicle previously described in Example 7 and 40 parts by weight of silica fine particles (SUNSPHERE NP-30; manufactured by AGC Si-Tech Co., Ltd.) with a particle size of 10 μm as inorganic fine particles based on 100 parts by weight of a photo-curable urethane acrylate (UNIDIC 17-824-9; manufactured by DIC Graphics Corporation) was applied in an application thickness of 15 g/m² to form a top coat layer 4 to obtain a decorated sheet shown in FIG. 2.

Each decorated sheet obtained in the above Examples 7 to 9 and the above Comparative Examples 7 to 9 was laminated with a wooden substrate using a urethane based adhesive, and then, the transparency of the surface determined visually, the surface hardness determined in a Hoffman scratch test and a steel wool rubbing test, and the V-groove bending processability determined in a V-groove bending test were each evaluated. The obtained evaluation results are shown in Table 3.

The criteria in each evaluation are as follows.

⊚: Having very good transparency, abrasion resistance or post-processing resistance.

○: Having good transparency, abrasion resistance or post-processing resistance.

X: Poor transparency, abrasion resistance or post-processing resistance.

Note that Table 3 is a table corresponding to Table 1 described in the specification of Japanese Patent Application No. 2015-045763 as a prior application, and Examples 7 to 9 in the present specification correspond to Examples 1 to 3 in the prior application, and Comparative Examples 7 to 9 in the present specification correspond to Comparative Examples 1 to 3 in the prior application.

TABLE 3

| | Transparency | Steel wool test | Hoffman scratch test | V-cut bending test |
|---|---|---|---|---|
| Example 7 | ○ | ⊚ | ⊚ | ○ |
| Example 8 | ○ | ○ | ⊚ | ⊚ |
| Example 9 | ○ | ○ | ○ | ○ |
| Comparative Example 7 | X | X | ○ | X |
| Comparative Example 8 | ○ | X | X | ○ |
| Comparative Example 9 | X | ○ | ○ | X |

As is shown in Table 3, the decorated sheets of Examples 7 to 9 had good transparencies and led to good results in the steel wool test and the Hoffman scratch test. This is considered that the dispersant added to the top coat layer 4 has undergone nano treatment using a supercritical reverse phase evaporation method of the present invention, and therefore, the dispersant had a high dispersibility in the resin composition of the top coat layer 4, and as a result, the dispersant allowed for the silica fine particles to be homogeneously dispersed, and thus, made it possible to possess a good transparency, and at the same time, the dispersant had an excellent dispersibility of silica fine particles, and therefore, had a high adhesiveness to a resin material that was a main component of the resin composition composing the top coat layer 4, and silica fine particles were immobilized to the surface to increase the hardness to provide an improvement in abrasion resistance.

On the other hand, the decorated sheets obtained in Comparative Example 7 and Comparative Example 9 resulted in poor transparences in comparison to the decorated sheets of Examples 7 to 9. As the reason of this, it is considered that, with regard to Comparative Example 7, a sufficient dispersibility was not obtained due to the dispersant without nano treatment applied, and with regard to Comparative Example 9, too large addition amount of the silica fine particles added to the top coat layer 4 resulted in secondary aggregation to reduce the dispersibility.

Also, in the steel wool test and the Hoffman scratch test, the decorated sheet of Comparative Example 8 resulted in a poor surface hardness (abrasion resistance) in comparison to the decorated sheets of Examples 7 to 9. As the reason of this, it is considered that the amount of the silica fine particles added was small, and an improving effect on the abrasion resistance was not obtained.

Also, the decorated sheets obtained in Examples 7 to 9 and Comparative Example 8 resulted in good V-groove bending processabilities. The V-groove bending processability is especially good in Example 8, and it is considered that the provision of higher flexibility was allowed by the top coat layer 4 that was a mixture of the photo-curable resin and the heat-curable resin.

As is apparent from Table 3, it can be said that, in comparison to the decorated sheet according to Comparative Example 7, the decorated sheets according to Examples 7 to 9 using, in the top coat layer 4, a curable resin to which a dispersant with treatment applied by means of a supercritical reverse phase evaporation method of the present invention are decorated sheets that have high transparencies, and are excellent in abrasion resistances and V-groove bending processabilities. Also, it can be said that, in comparison to the decorated sheets according to Comparative Example 8 and Comparative Example 9, the decorated sheets according to Examples 7 to 9 are decorated sheets excellent in transparency or abrasion resistance.

Example 10

In Example 10, a decorated sheet of the embodiment 4 in the configuration of FIG. 2 was produced. Specifically, a specific aspect of a decorated sheet that comprises a primary film layer 7 using magnesium 12-hydroxystearate as a dispersant and calcium carbonate as an inorganic filler and that comprise a transparent resin layer 1 is explained.

To begin with, a specific procedure in a preparation method of a dispersant vesicle is explained. In the preparation of the vesicle, into a high pressure stainless vessel kept at 60° C. were placed 100 parts by weight of methanol, 70 parts by weight of magnesium 12-hydroxystearate as an encapsulating substance forming dispersant, and 5 parts by weight of phosphatidylcholine as a phospholipid (outer membrane forming dispersant) in these proportions followed by tightly closing, and carbon dioxide was injected so as to achieve a pressure in the vessel of 20 MPa for a supercritical state, and, with vigorous stirring and mixing, 100 parts by weight of ion-exchanged water was injected, and after stirring and mixing for 15 minutes with the temperature and pressure kept, carbon dioxide was discharged to recover the atmospheric pressure, and, by a supercritical reverse phase evaporation method, a dispersant vesicle comprising the dispersants and an outer membrane consisting of a phospholipid within which the dispersants were encapsulated was obtained.

To a highly crystalline homopolypropylene resin having an isotactic pentad fraction of 97.8%, an MFR (melt flow rate) (230° C.) of 15 g/10 min, and a molecular weight distribution MWD (Mw/Mn) of 2.3 were added 500 ppm of a hindered phenol based anti-oxidant (Irganox 1010: manufactured by BASF SE), 2000 ppm of a benzotriazole based ultraviolet absorbent (Tinuvin 328: manufactured by BASF SE), and 2000 ppm of a hindered amine based light stabilizer (Chimassorb 944: manufactured by BASF SE), and this resin was extruded using a melt extruding machine to film-form a transparent resin sheet with a thickness of 80 μm made from highly crystalline polypropylene for use as a transparent resin layer 1. Subsequently, both surfaces of the film-formed transparent resin sheet underwent corona treatment to achieve a wetting tension on the surfaces of 40 dyn/cm or more.

On the other hand, 40 parts by weight of a dispersant vesicle within which magnesium 12-hydroxystearate was encapsulated as a dispersant obtained by the above method and 100 parts by weight of calcium carbonate (manufactured by SHIRAISHI CALCIUM Kaisha, Ltd.: SOFTON 2000) as an inorganic filler were added to 100 parts by weight of a high density polyethylene (manufactured by PRIME POLYMER CO., LTD.: HI-ZEX 5305E MFR=0.8 g/10 min (190° C.)), and melt-kneaded using an intermeshing type twin-screw extruding machine, and then, pelletization was conducted by a strand cut process to obtain pellets of the thermoplastic resin composition. By a calendaring process using these pellets of the thermoplastic resin composition, a primary film sheet as a primary film layer 7 with a thickness of 70 μm was film-formed. To the primary film sheet, pattern printing was carried out by a two-component type curable urethane ink (V180: manufactured by TOYO Ink Manufacturing Co., Ltd.) to form a pattern layer 2, and also, the backside of the primary film sheet was provided with a primer coat to form a primer layer 5. After this, the pattern layer 2 of the primary film sheet was laminated with the transparent resin layer 1 of the above transparent resin sheet via an adhesive layer 6 based on an adhesive for dry lamination (TAKELAC A540; manufactured by Mitsui Chemicals, Inc.; amount applied of 2 g/m$^2$) by a dry lamination process. Next, by press working using a metal mold roll for embossment, an emboss design 1a was provided on the top surface of the transparent resin layer 1 in the laminated sheet, and then, on that emboss design 1a surface, a two-component type curable urethane top coat (W184: manufactured by DIC Graphics Corporation) was applied in an amount applied of 3 g/m$^2$ to form a top coat layer 4 to obtain a decorated sheet with a total thickness of 154 μm shown in FIG. 2.

Example 11

In Example 11, a decorated sheet of the embodiment 4 in the configuration of FIG. 4 was produced. Specifically, a specific aspect of a decorated sheet that comprises a primary film layer 7 using magnesium 12-hydroxystearate as a dispersant and calcium carbonate as an inorganic filler and that does not comprises a transparent resin layer 1 is explained.

40 parts by weight of a dispersant vesicle within which magnesium 12-hydroxystearate was encapsulated as a dispersant obtained by the method described in Example 10 and 100 parts by weight of calcium carbonate (manufactured by SHIRAISHI CALCIUM Kaisha, Ltd.: SOFTON 2000) as an inorganic filler were added to 100 parts by weight of a high density polyethylene (manufactured by PRIME POLYMER CO., LTD.: HI-ZEX 5305E MFR=0.8 g/10 min (190° C.)), and melt-kneaded using an intermeshing type twin-screw extruding machine, and then, pelletization was conducted by a strand cut process to obtain pellets of the thermoplastic resin composition. By a calendaring process using these pellets of the thermoplastic resin composition, a primary film sheet as a primary film layer 7 with a thickness of 90 μm was film-formed. To the primary film sheet, pattern printing was carried out by a two-component curable type urethane ink (V180: manufactured by TOYO Ink Manufacturing Co., Ltd.) to form a pattern layer 2, and also, the backside of the primary film sheet was provided with a primer coat to form a primer layer 5. Then, on the pattern layer 2, a two-component curable type urethane top coat (W184: manufactured by DIC Graphics Corporation) was applied in an amount applied of 3 g/m$^2$ to form a top coat layer 4 to obtain a decorated sheet with a total thickness of 94 μm shown in FIG. 4.

Example 12

In Example 12, a decorated sheet of the embodiment 4 in the configuration of FIG. 2 was produced. Specifically, a specific aspect of a decorated sheet that comprises a primary film layer 7 to which a dispersant vesicle using vinyltriethoxysilane as a dispersant and calcium carbonate as an inorganic filler were blended and that comprises a transparent resin layer 1 is explained.

For a transparent resin sheet made from a highly crystalline polypropylene resin for use as a transparent resin layer 1, a transparent resin sheet similar to that in Example 10 is used. First of all, 4 parts by weight of a dispersant vesicle within which vinyltriethoxysilane was encapsulated as a dispersant obtained by the method described in Example 10 and 200 parts by weight of calcium carbonate (manufactured by SHIRAISHI CALCIUM Kaisha, Ltd.: SOFTON 2000) as an inorganic filler were added to 100 parts by weight of a highly crystalline homopolypropylene resin having an isotactic pentad fraction of 97.8%, an MFR (melt flow rate) (230° C.) of 15 g/10 min, a molecular weight distribution MWD (Mw/Mn) of 2.3, and melt-kneaded using an intermeshing type twin-screw extruding machine, and then, pelletization was conducted by a strand cut process to obtain pellets of the thermoplastic resin composition. These pellets of the thermoplastic resin composition were extruded through a T die by melt film-forming by means of a single-screw extruding machine, and uniaxial stretching was conducted in-line to the stretching ratio of fourfold to obtain a primary film sheet for use as a primary film layer 7 with a thickness of 50 μm. To the primary film sheet, pattern printing was carried out by a two-component curable type urethane ink (V180: manufactured by TOYO Ink Manufacturing Co., Ltd.) to form a pattern layer 2, and also, the backside of the primary film sheet was provided with a primer coat to provide a primer layer 5. Then, the primary film sheet was laminated with the transparent resin sheet via an adhesive layer 6 based on an adhesive for dry lamination (TAKELAC A540; manufactured by Mitsui Chemicals, Inc.; amount applied of 2 g/m$^2$) by a dry lamination process, and, by press working using a metal mold roll for embossment, an emboss design 1a was provided on the top surface of the transparent resin layer 1, and then, on that emboss design 1a surface, a two-component curable type urethane top coat (W184: manufactured by DIC Graphics Corporation) was applied in an amount applied of 3 g/m$^2$ to form a top coat layer 4 to obtain a decorated sheet with a total thickness of 135 μm shown in FIG. 3.

Comparative Example 10

In Comparative Example 10, a decorated sheet was made to which a dispersant was not added, and calcium carbonate as an inorganic filler was added. The specific production method is explained hereinbelow. Note that the same transparent resin layer 1 as in Example 10 is used.

100 parts by weight of calcium carbonate (manufactured by SHIRAISHI CALCIUM Kaisha, Ltd.: SOFTON 2000) as an inorganic filler was added to 100 parts by weight of a high density polyethylene (manufactured by PRIME POLYMER CO., LTD.: HI-ZEX 5305E MFR=0.8 g/10 min (190° C.)), and melt-kneaded using an intermeshing type twin-screw extruding machine, and then, pelletization was conducted by a strand cut process to obtain pellets of the thermoplastic resin composition. By a calendaring process using these pellets of the thermoplastic resin composition, a primary film sheet as a primary film layer 7 with a thickness of 70 μm was film-formed. A decorated sheet was obtained by a similar processing to Example 10 with regard to the following steps.

Comparative Example 11

In Comparative Example 11, a decorated sheet was made which was produced without the addition of a dispersant and an inorganic filler. Note that the same transparent resin layer 1 as in Example 10 is used.

By a calendaring process using high density polyethylene (manufactured by PRIME POLYMER CO., LTD.: HI-ZEX 5305E MFR=0.8 g/10 min (190° C.)), a primary film sheet as a primary film layer 7 with a thickness of 70 μm was film-formed. A decorated sheet was obtained by a similar processing to Example 10 with regard to the following steps.

With regard to each decorated sheet obtained in the above Examples 10 to 12 and the above Comparative Examples 10 and 11, the results of the fire testing conducted by a cone calorimeter testing machine and tensile tests are shown in Table 4.

Note that Table 4 is a table corresponding to Table 1 described in the specification of Japanese Patent Application No. 2014-256197 as a prior application, and Examples 10 to 12 in the present specification correspond to Examples 1 to 3 in the prior application, and Comparative Example 10 and Comparative Example 11 in the present specification correspond to Comparative Example 1 and Comparative Example 2 in the prior application.

TABLE 4

| | Fire testing | | | Tensile test | |
|---|---|---|---|---|---|
| | Total heat released (MJ/m$^2$) | Maximum heat release rate (kW/m$^2$) | Total time over 200 k (sec) | Tensile elastic modulus (MPa) | Tensile breaking elongation (%) |
| Example 10 | 4.75 | 202.98 | 3.7 | 840 | 300 |
| Example 11 | 4.12 | 185.30 | 0 | 800 | 320 |
| Example 12 | 3.35 | 161.86 | 0 | 950 | 230 |
| Comparative Example 10 | 5.35 | 205.21 | 4.3 | 1420 | 75 |
| Comparative Example 11 | 8.9 | 206.31 | 11.2 | 700 | 500 |

From the results of the conduction of each test, as is shown in Table 4, it has been revealed that the decorated sheets in Examples 10 to 12 employing the primary film layer 7 to which a dispersant (dispersant vesicle) vesiculated by a supercritical reverse phase evaporation method of the present invention and an inorganic filler were added are "noncombustible materials" satisfying the technical criteria of noncombustible materials defined in the Enforcement Order of Building Standards Law. Comparative Example 10 to which an inorganic filler was added was a "noncombustible material" satisfying the technical criteria of noncombustible materials, but Comparative Example 11 to which no inorganic filler was added had a total heat released of 8.9 MJ/m$^2$ and did not satisfy the technical criteria of noncombustible materials.

Also, it has been revealed that, in the decorated sheets in Examples 10 to 12, any of the decorated sheets accomplished a tensile elastic modulus of 500 MPa or more and 2000 MPa or less as well as a tensile breaking elongation of 200% or more, and is a decorated sheet excellent in post-processing resistance possessing a mechanical strength required for a decorated sheet. Comparative Example 10 to which no dispersant was added and an inorganic filler was only added had a very small tensile breaking elongation of 75%, and did not have a mechanical strength required for a decorated sheet. Comparative Example 11 to which a dispersant or an inorganic filler was not added had a mechanical strength required for a decorated sheet.

From the above results, it can be said that the decorated sheets in Examples 10 to 12 are "noncombustible materials" satisfying the technical criteria of noncombustible materials defined in the Enforcement Order of Building Standards Law, and are decorated sheets excellent in post-processing resistance possessing a mechanical strength required for a decorated sheet.

Example 13

In Example 13, a decorated sheet of the embodiment 1 in the configuration of FIG. 2 was produced. Specifically, the decorated sheet is a decorated sheet comprising a transparent resin layer 1 that contains a nucleating agent vesicle obtained by a supercritical reverse phase evaporation method.

First of all, a preparation method of a nucleating agent vesicle used in the present Example is explained. As a nucleating agent, a phosphoric acid ester metal salt based nucleating agent (Adekastab NA-21: manufactured by ADEKA Corporation) was used. With regard to a nucleating agent vesicle, into a high pressure stainless vessel kept at 60° C. were placed 35.5% by weight of methanol, 27% by weight of a nucleating agent and 2% by weight of phosphatidylcholine as a phospholipid in these proportions followed by tightly closing, and carbon dioxide was injected so as to achieve a pressure in the vessel of 20 MPa for a supercritical state, and, with vigorous stirring and mixing, 35.5% by weight of ion-exchanged water was injected, and after stirring and mixing for 15 minutes with the temperature and pressure kept, carbon dioxide was discharged to recover the atmospheric pressure to obtain a nucleating agent vesicle.

A decorated sheet was produced by a method for laminating a transparent resin layer 1 explained in Example 7 with a primary film layer 7 by a dry lamination process. Note that, during the film-forming of the transparent resin layer 1, by adjusting the cooling conditions, a transparent resin layer 1 having a haze value shown in Table 5 was made. Note that the results of examples using a nucleating agent without vesiculation were also described in Table 5.

With regard to each of the resulting decorated sheets, the measurement of haze value, the measurement of tensile elastic modulus and tensile breaking elongation, the measurement of surface hardness in a pencil hardness test, and the evaluation of post-processing resistance by a V-groove bending test were performed. The obtained evaluation results are shown in Table 5. Note that, in Table 5, the parts in bold correspond to the decorated sheets of the present invention and the non-bold parts show comparative examples.

Hereinbelow, the test method in each evaluation test is briefly explained.

<Haze-Value Measuring Test>

Here, in the case where light input from one surface of an object is output to the other surface, a haze value is a value expressed in percentage that is a value achieved by the division of a value (diffused transmittance) obtained by subtracting integrated values of only linear components in light rays output from the other surface (linear transmittance) from all integrated values (total luminous transmittance) of light rays output from the other surface by the total luminous transmittance, and a smaller value of the haze value expresses a higher transparency. This haze value is dominated by an internal haze determined by a state within an object such as the degree of crystallinity and the size of spherulite in the crystal part as well as an external haze determined by a state of the surface of the object such as the presence or absence of depressions and projections on the input plane and the output plane. Note that, in the present invention, in a mere reference to a haze value, the haze value means a value determined by an internal haze and an external haze. In the present Example, a haze-value measuring test was conducted for each transparent resin sheet using a haze-value measuring tester (manufactured by NIPPON DENSHOKU INDUSTRIES CO., LTD.; NDH2000). Blank measurement has been previously conducted in a state where nothing has been attached to a sample holder. In the measurement of each transparent resin sheet, after the attachment of a sample to a sample holder, sample penetrating measurement was performed under the same conditions as in the blank measurement, and a haze value was calculated as the ratio of the sample penetrating measurement and the blank measurement expressed in percentage.

<Measurement Method of Tensile Elastic Modulus and Tensile Breaking Elongation>

From the resulting decorated sheet, a test piece for tensile test is produced using Super Dumbbell Cutter (manufactured by DUMBBELL CO., LTD.) in accordance with JIS K-7127-4. The resulting test piece is set to a tensile testing machine (manufactured by TENSILON) and pulled at a pulling speed of 50 mm/min, and tensile breaking elongation is calculated from the ratio of the length immediately before the breaking of the test piece and the length before the test. Moreover, tensile elastic modulus was calculated from the slope within the elastic region where the stress and strain in the stress-strain curve obtained in the test had a proportional relationship.

<Pencil Hardness Test>

In the pencil hardness test, using pencils of 3B, 2B, B, HB, F, H, 2H and 3H, the angle of pencil is fixed at 45±1° to a decorated sheet, and the pencil is slid in a state where a load of 1 kg is imposed to the pencil to determine whether or not flaws are formed on the decorated sheet (in accordance with old JIS standard JIS K5400). Beginning from pencils with the lowest hardness, the hardness at which scratch mark was formed is shown as the surface hardness of the decorated sheet 10.

<V-Groove Bending Processability Test>

In a V-groove bending processability test, each decorated sheet obtained by the above method is affixed onto one surface of a medium density fiberboard (MDF) as a substrate using a urethane based adhesive, and, so as not to create flaws on the opposite decorated sheet, the other surface of the substrate is provided with a V-shaped groove reaching to the boundary at which the substrate is laminated with the decorated sheet. Next, the substrate is folded along the V-shaped groove to 90 degrees so as to mountain-fold a surface of the decorated sheet, and an optical microscope is used to observe whether or not whitening or cracking and the like are formed on the folded part of the surface of the decorated sheet to conduct the evaluation of the superiority and inferiority of post-processing resistance. In Table 5, the evaluation results of post-processing resistance are shown in the item of "V-cut," and the evaluation was conducted in the following two stages.

◯: Whitening and cracking or the like were not observed.

X: Whitening and cracking unacceptable for a decorated sheet were observed.

TABLE 5

| Vesiculation | Haze value [%] | Tensile elastic modulus [MPa] | Tensile breaking elongation [%] | Pencil hardness | V-cut |
|---|---|---|---|---|---|
| Present | 13 | 700 | 200 | HB | X |
| Present | 12 | 700 | 250 | HB | X |
| Present | 12 | 700 | 300 | H | X |
| Present | 13 | 800 | 200 | 2H | X |
| Present | 11 | 800 | 250 | 2H | ◯ |
| Present | 10 | 800 | 300 | 2H | ◯ |
| Present | 11 | 1000 | 200 | 2H | X |
| Present | 12 | 1000 | 250 | 2H | ◯ |
| Present | 11 | 1000 | 300 | 2H | ◯ |
| Present | 11 | 2000 | 200 | 2H | X |
| Present | 13 | 2000 | 250 | 2H | ◯ |
| Present | 11 | 2000 | 300 | 2H | ◯ |
| Present | 11 | 2500 | 200 | 2H | X |
| Present | 11 | 2500 | 250 | 2H | X |
| Present | 13 | 2500 | 300 | 2H | X |
| Present | 18 | 1500 | 250 | 2H | ◯ |
| Present | 8 | 2000 | 250 | 2H | ◯ |
| Present | 5 | 1500 | 100 | 2H | X |
| Absent | 15 | 1200 | 90 | B | X |
| Absent | 20 | 1000 | 200 | B | X |
| Absent | 10 | 600 | 450 | 3B | ◯ |

As is apparent from Table 5, by making a decorated sheet comprising a transparent resin layer 1 having a haze value of 13% or less, a tensile elastic modulus in the range of 800 to 2000 MPa, and a tensile breaking elongation of 250% or more, a decorated sheet possessing excellent surface hardness and post-processing resistance is obtained. The decorated sheets comprising a transparent resin layer 1 that contains a nucleating agent vesicle obtained by a supercritical reverse phase evaporation method but has the haze value, the tensile elastic modulus and the tensile breaking elongation not within a range of the present invention did not possess post-processing resistances required for a decorated sheet.

Example 14

In Example 14, a decorated sheet of the embodiment 1 in the configuration of FIG. 2 was produced. Specifically, the decorated sheet is a decorated sheet comprising a transparent resin layer 1 that contains a nucleating agent vesicle obtained by an extrusion process.

First of all, the preparation method of a nucleating agent vesicle used in the present Example is explained. As a nucleating agent, a phosphoric acid ester metal salt based nucleating agent (Adekastab NA-21: manufactured by ADEKA Corporation) was used. As the preparation method, a phospholipid suspension in which 100 parts by weight of distilled water, 0.7 parts by weight of a nucleating agent, and 0.05 parts by weight of phosphatidylcholine as a substance composing an outer membrane of a vesicle are mixed is placed into glass syringes, and the glass syringes are set to both sides of an extruder across a membrane filter with an arbitrary pore size. Under an arbitrary temperature of this extruder, the syringes in the glass syringes set to the both sides were alternately operated to pass through the membrane filter at an arbitrary number of times to obtain a nucleating agent vesicle encapsulating the nucleating agent.

A decorated sheet was produced by a method for laminating a transparent resin layer 1 explained in Example 7 with a primary film layer 7 by a dry lamination process. Note that, during the film-forming of the transparent resin layer 1, by adjusting the cooling conditions, the transparent resin layer 1 having a haze value shown in Table 6 was made.

With regard to each of the resulting decorated sheets, the measurement of haze value, the measurement of tensile elastic modulus and tensile breaking elongation, the measurement of surface hardness in a pencil hardness test, and the evaluation of post-processing resistance by a V-groove bending test were performed. The obtained evaluation results are shown in Table 6. Note that in Table 6, the parts in bold correspond to the decorated sheets of the present invention, and the non-bold parts show comparative examples. The specific method of evaluation method and the explanation of symbols described in the table are the same as those in Example 13.

TABLE 6

| Vesiculation | Haze value [%] | Tensile elastic modulus [MPa] | Tensile breaking elongation [%] | Pencil hardness | V-cut |
|---|---|---|---|---|---|
| Present | 14 | 700 | 180 | B | X |
| Present | 13 | 700 | 200 | B | X |
| Present | 12 | 700 | 300 | HB | X |
| Present | 14 | 800 | 180 | HB | X |
| Present | 13 | 800 | 200 | H | ○ |
| Present | 12 | 800 | 300 | H | ○ |
| Present | 12 | 1000 | 180 | H | X |
| Present | 13 | 1000 | 200 | H | ○ |
| Present | 12 | 1000 | 300 | H | ○ |
| Present | 12 | 2000 | 180 | H | X |
| Present | 15 | 2000 | 200 | H | ○ |
| Present | 12 | 2000 | 300 | H | ○ |
| Present | 12 | 2200 | 180 | H | X |
| Present | 12 | 2200 | 200 | H | X |
| Present | 14 | 2200 | 300 | H | X |
| Present | 20 | 2000 | 250 | H | X |
| Present | 10 | 1500 | 100 | H | X |
| Absent | 15 | 1200 | 90 | B | X |
| Absent | 20 | 1000 | 200 | B | X |
| Absent | 10 | 600 | 450 | 3B | ○ |

As is apparent from Table 6, by making a decorated sheet comprising a transparent resin layer 1 having a haze value of 15% or less, a tensile elastic modulus in the range of 800 to 2000 MPa, and a tensile breaking elongation of 200% or more, a decorated sheet possessing excellent surface hardness and post-processing resistance is obtained. The decorated sheets comprising a transparent resin layer 1 that contains a nucleating agent vesicle but has the haze value, the tensile elastic modulus and the tensile breaking elongation not within a range of the present invention did not possess post-processing resistances required for a decorated sheet. Note that decorated sheets using a transparent resin layer 1 that contains a nucleating agent without vesiculation did not have post-processing resistances, designs and surface hardnesses required for a decorated sheet.

Example 15

In Example 15, decorated sheets of the embodiment 2 and embodiment 3 in the configuration of FIG. 2 were produced. Specifically, the decorated sheets are decorated sheets comprising a top coat layer 4 that contains a dispersant vesicle obtained by a supercritical reverse phase evaporation method and inorganic fine particles. Also, the decorated sheet of the embodiment 3 further comprises a transparent resin layer 1 that contains a nucleating agent vesicle obtained by a supercritical reverse phase evaporation method.

First of all, the preparation method of a dispersant vesicle used in the present Example is explained. As a dispersant, 3-methacryloxypropyltrimethoxysilane or magnesium 12-hydroxystearate was used. With regard to the dispersant vesicle, into a high pressure stainless vessel kept at 60° C. were placed 35.5% by weight of methanol, 27% by weight of a dispersant, and 2% by weight of phosphatidylcholine as a phospholipid in these proportions followed by tightly closing, and carbon dioxide was injected so as to achieve a pressure in the vessel of 20 MPa for a supercritical state, and, with vigorous stirring and mixing, 35.5% by weight of ion-exchanged water was injected, and, after stirring and mixing for 15 minutes with the temperature and pressure kept, carbon dioxide was discharged to recover the atmospheric pressure to obtain a dispersant vesicle. A nucleating agent vesicle for use in the decorated sheet of the embodiment 3 was obtained by the method described in Example 13.

The following steps in the production of a decorated sheet were produced by a similar method to Example 9. Note that the haze values in Table 7 are the results of measurement of the transparent layers in which a top coat layer 4 was layered on a transparent resin layer 1. The materials of the primary film layer 7 are not especially limited, but, in the present Example, a polyolefin based resin was used for the production. Also, as a photo-curable resin (the item of "photo" in Table 7), a photo-curable urethane acrylate (UNIDIC 17-824-9; manufactured by DIC Graphics Corporation) was used, and as a heat-curable resin (the item of "heat" in Table 7), a two-component type curable urethane top coat (W184; manufactured by DIC Graphics Corporation) was used. As a mixture of a photo-curable resin and a heat-curable resin (the item of "photo/heat" in Table 7), a mixture of 60 parts by weight of the photo-curable resin and 40 parts by weight of the heat-curable resin in these proportions was used.

With regard to the decorated sheets obtained by the above method, the measurement of haze value, the evaluation of surface hardness in a steel wool rubbing test and Hoffman scratch test, and the evaluation of post-processing resistance in a V-groove bending test were performed, and the obtained results are shown in Table 7. The test method in each evaluation test is briefly explained. The methods of the measurement of haze value and V-groove bending test were explained in Example 13, and so, are omitted. The evaluation results of V-groove bending test are shown in the item of "V-cut." Note that, in Table 7, the parts in bold correspond to the decorated sheets of the present invention, and the non-bold parts show comparative examples.

<Steel Wool Rubbing Test>

In a steel wool rubbing test, a jig was used for fixing in a state where a steel wool abutted a surface of each decorated sheet laminated with a wooden substrate, and with a load of 500 g imposed to the jig, the surface was rubbed under the conditions of a constant speed, a distance of 50 mm, and shuttles of 50 times to determine the presence or absence of the damage on the surface of the decorated sheet visually. As a steel wool, Bonstar #0 (manufactured by NIPPON STEEL WOOL CO., LTD.) was rounded and used.

<Hoffman Scratch Test>

In a Hoffman scratch test, a Hoffman scratch hardness tester (manufactured by BYK-Gardner) was used to scratch a surface of each decorated sheet laminated with a wooden substrate at a constant speed with a load of 1200 g to determine the presence or absence of the damage on the surface of the decorated sheet visually. Note that the explanation of symbols in Table 7 is as follows.

⊚: Having very good transparency, abrasion resistance or post-processing resistance.

○: Having good transparency, abrasion resistance or post-processing resistance.

X: Poor transparency, abrasion resistance or post-processing resistance.

TABLE 7

| Top coat layer | Vesiculation Transparent resin layer | Inorganic fine particles [parts by weight] | Resin species | Haze value [%] | Steel wool | Hoffman scratch | V-cut |
|---|---|---|---|---|---|---|---|
| Present | Absent | 0.05 | Photo | ⊚ (10) | X | X | ○ |
| Present | Absent | 0.1 | Photo | ⊚ (10) | ○ | ○ | ○ |
| Present | Absent | 5 | Photo | ○ (12) | ⊚ | ○ | ○ |
| Present | Absent | 10 | Photo | ○ (10) | ⊚ | ○ | ○ |
| Present | Absent | 20 | Photo | ○ (13) | ⊚ | ○ | ○ |
| Present | Absent | 30 | Photo | ○ (13) | ⊚ | ○ | ○ |
| Present | Absent | 40 | Photo | X (16) | ○ | ○ | X |
| Present | Absent | 0.05 | Heat | ⊚ (10) | X | X | ○ |
| Present | Absent | 0.1 | Heat | ⊚ (10) | ○ | ○ | ○ |
| Present | Absent | 5 | Heat | ○ (12) | ⊚ | ○ | ○ |
| Present | Absent | 10 | Heat | ○ (13) | ⊚ | ○ | ○ |
| Present | Absent | 20 | Heat | ○ (13) | ⊚ | ○ | ○ |
| Present | Absent | 30 | Heat | ○ (13) | ⊚ | ○ | ○ |
| Present | Absent | 40 | Heat | X (16) | ○ | ○ | X |
| Present | Absent | 5 | Photo/Heat | ○ (12) | ⊚ | ○ | ○ |
| Present | Absent | 10 | Photo | ○ (13) | ⊚ | ○ | ○ |
| Present | Absent | 10 | Photo | ○ (13) | ⊚ | ○ | ○ |
| Present | Present | 0.05 | Photo | ○ (12) | X | ○ | ○ |
| Present | Present | 0.1 | Photo | ○ (12) | ○ | ⊚ | ⊚ |
| Present | Present | 10 | Photo | ○ (13) | ⊚ | ⊚ | ⊚ |
| Present | Present | 30 | Photo | ○ (13) | ⊚ | ○ | ○ |
| Present | Present | 40 | Photo | X (17) | ○ | ○ | ○ |
| Present | Present | 5 | Photo | X (17) | X | ○ | ○ |
| Present | Present | 10 | Photo | ○ (10) | ⊚ | ⊚ | ⊚ |
| Absent | Absent | 5 | Photo | X (17) | X | X | ○ |
| Absent | Absent | 5 | Heat | X (18) | X | X | ○ |

Numerical values within the parentheses in the evaluation item of haze value in Table 7 are measured values. As is apparent from Table 7, by making decorated sheets of the embodiment 2 and embodiment 3 comprising a top coat layer 4 having a haze value of 13% or less to which the dispersant vesicle obtained by a supercritical reverse phase evaporation method and 0.1 to 30 parts by weight of inorganic fine particles were blended, decorated sheets possessing excellent abrasion resistance and post-processing resistance are obtained. Also, in the decorated sheets of the aspect of the embodiment 3, it is found that the transparent resin layer 1 containing a nucleating agent vesicle obtained by a supercritical reverse phase evaporation method can be used to provide more excellent abrasion resistance and post-processing resistance.

Example 16

In Example 16, decorated sheets of the embodiment 2 and embodiment 3 in the configuration of FIG. 2 were produced. Specifically, the decorated sheets are decorated sheets comprising a top coat layer 4 that contains a dispersant vesicle obtained by an extrusion process and inorganic fine particles. Also, the decorated sheet of the embodiment 3 further comprises a transparent resin layer 1 that contains a nucleating agent vesicle obtained by an extrusion process.

First of all, the preparation method of a dispersant vesicle used in the present Example is explained. As a dispersant, 3-methacryloxypropyltrimethoxysilane or magnesium 12-hydroxystearate was used. With regard to a dispersant vesicle, a phospholipid suspension in which 100 parts by weight of distilled water, 0.7 parts by weight of a dispersant, and 0.05 parts by weight of phosphatidylcholine as a substance composing an outer membrane of a vesicle are mixed is placed into glass syringes, and the glass syringes are set to both sides of an extruder across a membrane filter with an arbitrary pore size. Under an arbitrary temperature of this extruder, the syringes in the glass syringes set to the both sides were alternately operated to pass through the membrane filter at an arbitrary number of times to obtain a dispersant vesicle. A nucleating agent vesicle for use in the decorated sheet of the embodiment 3 was obtained by the method described in Example 14.

A decorated sheet was produced by a similar method to Example 9. Note that the haze values in Table 8 are the results of measurement for the transparent layer in which a top coat layer 4 was layered on a transparent resin layer 1. The materials of the primary film layer 7 are not especially limited, but in the present Example, a polyolefin based resin was used for the production. Also, as a photo-curable resin (the item of "photo" in Table 8), a photo-curable urethane acrylate (UNIDIC 17-824-9; manufactured by DIC Graphics Corporation) was used, and as a heat-curable resin (the item of "heat" in Table 8), a two-component curable type urethane top coat (W184; manufactured by DIC Graphics Corporation) was used. As a mixture of a photo-curable resin and a heat-curable resin (the item of "photo/heat" in Table 8), a mixture of 60 parts by weight of the photo-curable resin and 40 parts by weight of the heat-curable resin were mixed in these proportions was used.

With regard to the decorated sheet obtained by the above method, the measurement of haze value, the evaluation of surface hardness in a steel wool rubbing test and Hoffman scratch test, and the evaluation of post-processing resistance in a V-groove bending test were performed, and the obtained results are shown in Table 8. The test method in each evaluation test and the explanation of symbols in the evaluation were explained in Example 13 and Example 15, and so, are omitted. The evaluation results of V-groove bending test are shown in the item of "V-cut." Note that, in Table 8, the parts in bold correspond to the decorated sheets of the present invention, and the non-bold parts show comparative examples.

Specifically, the decorated sheets are decorated sheets comprising a primary film layer 7 that contains a dispersant vesicle obtained by a supercritical reverse phase evaporation method and an inorganic filler. Also, in the decorated sheet of the embodiment 5 further comprises a transparent resin layer 1 that contains a nucleating agent vesicle obtained by a supercritical reverse phase evaporation method. Note that, as a dispersant vesicle, one prepared in Example 15 using magnesium 12-hydroxystearate was used, and as a nucleating agent vesicle, one prepared in Example 13 was used. The decorated sheets were produced by a method explained in Example 10. Note that, as is shown in Table 9, in some of the produced decorated sheets, uniaxially stretched sheet with uniaxial stretching processing applied at the stretching ratio of fourfold to a primary film layer 7 was used.

With regard to the decorated sheets obtained by the above method, fire testing by a cone calorimeter testing machine was performed. The obtained test results are shown in Table

TABLE 8

| Vesiculation | | Inorganic fine particles | | Haze | | | |
|---|---|---|---|---|---|---|---|
| Top coat layer | Transparent resin layer | [parts by weight] | Resin species | value [%] | Steel wool | Hoffman scratch | V-cut |
| Present | Absent | 0.05 | Photo | ⊚ (10) | X | X | ○ |
| Present | Absent | 0.1 | Photo | ◎ (10) | ○ | ○ | ○ |
| Present | Absent | 5 | Photo | ○ (12) | ○ | ○ | ○ |
| Present | Absent | 10 | Photo | ○ (10) | ○ | ○ | ○ |
| Present | Absent | 30 | Photo | ○ (14) | ◎ | ○ | ○ |
| Present | Absent | 40 | Photo | X (17) | ○ | ○ | X |
| Present | Absent | 0.05 | Heat | ⊚ (10) | X | X | ○ |
| Present | Absent | 0.1 | Heat | ◎ (10) | ○ | ○ | ○ |
| Present | Absent | 5 | Heat | ○ (12) | ○ | ○ | ○ |
| Present | Absent | 10 | Heat | ○ (12) | ○ | ○ | ○ |
| Present | Absent | 30 | Heat | ○ (14) | ◎ | ○ | ○ |
| Present | Absent | 40 | Heat | X (16) | ○ | ○ | X |
| Present | Absent | 5 | Photo/Heat | ○ (13) | ○ | ○ | ○ |
| Present | Absent | 10 | Photo | ○ (13) | ○ | ○ | ○ |
| Present | Absent | 10 | Photo | ○ (13) | ○ | ○ | ○ |
| Present | Present | 0.1 | Photo | ○ (14) | ○ | ◎ | ◎ |
| Present | Present | 10 | Photo | ○ (14) | ○ | ◎ | ◎ |
| Present | Present | 30 | Photo | ○ (14) | ◎ | ○ | ○ |
| Present | Present | 10 | Photo | ○ (10) | ○ | ◎ | ◎ |
| Absent | Absent | 5 | Photo | X (17) | X | X | ○ |
| Absent | Absent | 5 | Heat | X (18) | X | X | ○ |

As is apparent from Table 8, by making the decorated sheets of the embodiment 2 and embodiment 3 comprising a top coat layer 4 having a haze value of 14% or less to which the dispersant vesicle obtained by an extrusion process and 0.1 to 30 parts by weight of inorganic fine particles were blended, decorated sheets possessing excellent abrasion resistance and post-processing resistance are obtained. Also, in the decorated sheets of the aspect of the embodiment 3, it is found that the transparent resin layer 1 containing a nucleating agent vesicle obtained by an extrusion process can be used to provide more excellent abrasion resistance and post-processing resistance. Note that, the decorated sheets in which a vesicle was not blended to any of the resin layers of top coat layer 4 and transparent resin layer 1 failed to obtain abrasion resistance required for a decorated sheet.

Example 17

In Example 17, decorated sheets of the embodiment 4 and embodiment 5 in the configuration of FIG. 2 were produced.

9. Note that, in fire testing by a corn calorimeter testing machine in accordance with ISO 5660-1, the following requirements are required to be satisfied (Article 108bis(1) and (2) of the Enforcement Order of Building Standards Law). In order for a decorated sheet of the present invention to be approved as a noncombustible material, all of the requirement items of the following 1 to 3 are required to be satisfied under heating by radiation heat of 50 kW/m² for heating time of 20 minutes, in a state where the decorated sheet of the present invention is laminated with a noncombustible substrate:

1. The total heat released is 8 MJ/m² or less;
2. The highest heat release rate does not continuously exceed 200 kW/m² for 10 seconds or more; and
3. Neither a cracking nor a hole penetrating to the back surface, which is deleterious to fire prevention, is formed.

Note that a noncombustible substrate selected from a gypsum board, a fiber-admixed calcium silicate sheet or a galvanized steel sheet can be used.

TABLE 9

| Vesiculation | | Inorganic filler [parts by weight] | Presence and absence of stretching | Total heat released [MJ/m$^2$] | Maximum heat release rate [kW/m$^2$] | Total time over 200k [sec] |
|---|---|---|---|---|---|---|
| Primary film layer | Transparent resin layer | | | | | |
| Present | Absent | 0 | Absent | 8.7 | 220 | 14 |
| Present | Absent | 20 | Absent | 8.3 | 212 | 12 |
| Present | Absent | 50 | Absent | 7.7 | 201 | 6 |
| Present | Absent | 100 | Absent | 7.5 | 190 | 0 |
| Present | Absent | 500 | Absent | 6.5 | 180 | 0 |
| Present | Absent | 900 | Absent | 5.3 | 170 | 0 |
| Present | Absent | 1000 | Unable to film-form | | | |
| Present | Absent | 0 | Present (fourfold) | 8.3 | 195 | 0 |
| Present | Absent | 20 | Present (fourfold) | 8.1 | 192 | 0 |
| Present | Absent | 50 | Present (fourfold) | 7.4 | 184 | 0 |
| Present | Absent | 100 | Present (fourfold) | 7 | 179 | 0 |
| Present | Absent | 500 | Present (fourfold) | 5.7 | 167 | 0 |
| Present | Absent | 900 | Present (fourfold) | 4.8 | 158 | 0 |
| Present | Absent | 1000 | Unable to film-form | | | |
| Present | Present | 20 | Absent | 8.4 | 210 | 12 |
| Present | Present | 50 | Absent | 7.6 | 202 | 6 |
| Present | Present | 500 | Absent | 6.6 | 178 | 0 |
| Present | Present | 900 | Absent | 5.2 | 171 | 0 |
| Present | Present | 20 | Present (fourfold) | 8.1 | 193 | 0 |
| Present | Present | 50 | Present (fourfold) | 7.3 | 185 | 0 |
| Present | Present | 500 | Present (fourfold) | 5.5 | 165 | 0 |
| Present | Present | 900 | Present (fourfold) | 4.6 | 156 | 0 |
| Absent | Absent | 0 | Absent | 8.7 | 224 | 15 |

As is apparent from Table 9, by making a decorated sheet comprising a primary film layer 7 to which the dispersant vesicle obtained by a supercritical reverse phase evaporation method and 50 to 900 parts by weight of an inorganic filler were blended, a "noncombustible material" satisfying the technical criteria of noncombustible materials defined in the Enforcement Order of Building Standards Law can be made. Also, it is found that a decorated sheet further comprising a transparent resin layer 1 that contains a nucleating agent vesicle obtained by a supercritical reverse phase evaporation method also satisfies the technical criteria of noncombustible materials. Note that the decorated sheets comprising the primary film layer 7 to which a dispersant vesicle and an inorganic filler were not blended did not satisfy the technical criteria of noncombustible materials.

Example 18

In Example 18, a decorated sheet of the embodiment 4 in the configuration of FIG. 2 was produced. Specifically, the decorated sheet is a decorated sheet comprising a primary film layer 7 that contains a dispersant vesicle obtained by an extrusion process. Note that, as a dispersant vesicle, one prepared in Example 16 using magnesium 12-hydroxystearate was used. The decorated sheets were produced by a method explained in Example 10. The method of specific fire testing and the technical requirement of noncombustible materials were described in Example 17, and so are omitted. Note that, in some of the produced decorated sheets, as is shown in Table 10, uniaxially stretched sheet with uniaxial stretching processing at the stretching ratio of fourfold to a primary film layer 7 was used.

With regard to the decorated sheets obtained by the above method, fire testing by a cone calorimeter testing machine was performed. The obtained test results are shown in Table 10.

TABLE 10

| Vesiculation | | Inorganic filler [parts by weight] | Presence and absence of stretching | Total heat released [MJ/m$^2$] | Maximum heat release rate [kW/m$^2$] | Total time over 200k [sec] |
|---|---|---|---|---|---|---|
| Primary film layer | Transparent resin layer | | | | | |
| Present | Absent | 20 | Absent | 8.5 | 216 | 13 |
| Present | Absent | 50 | Absent | 7.8 | 203 | 8 |
| Present | Absent | 100 | Absent | 7.6 | 192 | 0 |
| Present | Absent | 500 | Absent | 6.7 | 184 | 0 |
| Present | Absent | 900 | Absent | 5.4 | 180 | 0 |
| Present | Absent | 1000 | Unable to film-form | | | |
| Present | Absent | 0 | Present (fourfold) | 8.5 | 198 | 0 |
| Present | Absent | 20 | Present (fourfold) | 8.3 | 194 | 0 |
| Present | Absent | 50 | Present (fourfold) | 7.8 | 187 | 0 |
| Present | Absent | 100 | Present (fourfold) | 7.4 | 180 | 0 |
| Present | Absent | 500 | Present (fourfold) | 6.3 | 171 | 0 |
| Present | Absent | 900 | Present (fourfold) | 5.1 | 163 | 0 |
| Present | Absent | 1000 | Unable to film-form | | | |

As is apparent from Table 10, by making a decorated sheet comprising a primary film layer 7 to which the dispersant vesicle obtained by an extrusion process and 50 to 900 parts by weight of an inorganic filler were blended, a "noncombustible material" satisfying the technical criteria of noncombustible materials defined in the Enforcement Order of Building Standards Law can be made.

Example 19

In Example 19, a decorated sheet of the embodiment 6 in the configuration of FIG. 2 was produced. Specifically, the decorated sheet is a decorated sheet comprising a transparent resin layer 1 containing a nucleating agent vesicle obtained by a supercritical reverse phase evaporation method, a top coat layer 4 containing a dispersant vesicle obtained by a supercritical reverse phase evaporation method and inorganic fine particles, and a primary film layer 7 that contains a dispersant vesicle obtained by a supercritical reverse phase evaporation method and an inorganic filler. Note that, as a nucleating agent vesicle, one prepared in Example 13 was used, and as a dispersant vesicle, one prepared in Example 15 using magnesium 12-hydroxystearate was used. Note that, in some of the produced decorated sheets, as is shown in Table 11, a uniaxially stretched sheet undergoing uniaxial stretching processing at the stretching ratio of fourfold to a primary film layer 7 was used.

The decorated sheet was produced by the following method. With regard to the transparent resin layer 1, to a highly crystalline homopolypropylene resin having an isotactic pentad fraction of 97.8%, an MFR (melt flow rate) (230° C.) of 15 g/10 min, and a molecular weight distribution MWD (Mw/Mn) of 2.3 were added 500 ppm of a hindered phenol based anti-oxidant (Irganox 1010: manufactured by BASF SE), 2000 ppm of a benzotriazole based ultraviolet absorbent (Tinuvin 328: manufactured by BASF SE), 2000 ppm of a hindered amine based light stabilizer (Chimassorb 944: manufactured by BASF SE), and 1000 ppm of a nucleating agent vesicle obtained by the previously described supercritical reverse phase evaporation method using a phosphoric acid ester metal salt based nucleating agent (Adekastab NA-21: manufactured by ADEKA Corporation) as a nucleating agent, and this resin was extruded using a melt extruding machine to obtain a transparent resin sheet with a thickness of 100 μm. Both surfaces of the resulting transparent resin sheet underwent corona treatment to achieve a wetting tension on the surfaces of the transparent resin sheet of 40 dyn/cm or more.

On the other hand, 40 parts by weight of the dispersant vesicle and 500 parts by weight of calcium carbonate (manufactured by SHIRAISHI CALCIUM Kaisha, Ltd.: SOFTON 2000) as an inorganic filler were added to 100 parts by weight of a high density polyethylene (manufactured by PRIME POLYMER CO., LTD.: HI-ZEX 5305E MFR=0.8 g/10 min (190° C.)), and melt-kneaded using an intermeshing type twin-screw extruding machine, and then, pelletization was conducted by a strand cut process to produce pellets of the thermoplastic resin composition. By a calendaring process using these pellets of the thermoplastic resin composition, a primary film layer 7 with a thickness of 70 μm was obtained. To one surface of the primary film layer 7, using an ink in which 0.5% by weight of a hindered amine based light stabilizing agent (Chimassorb 944; manufactured by BASF SE) was added to a two-component urethane ink (V180; manufactured by TOYO Ink Manufacturing Co., Ltd.) based on the binder resin content of the two-component urethane ink, pattern printing was carried out by a gravure printing process to provide a pattern layer 2, and also to provide a primer layer 5 on the other surface of the primary film layer 7. After this, one surface of the primary film layer 7 was laminated with a transparent resin sheet via an adhesive for dry lamination (TAKELAC A540; manufactured by Mitsui Chemicals, Inc.; amount applied of 2 g/m$^2$) as an adhesive layer 6 by a dry lamination process.

Then, an emboss design 1a was provided on a surface of the transparent resin sheet, and then, an ink fabricated by blending 0.5 parts by weight of the dispersant vesicle and 0.1 or 30 parts by weight of silica fine particles (SUNSPHERE NP-30; manufactured by AGC Si-Tech Co., Ltd.) with a particle size of 10 μm as inorganic fine particles based on 100 parts by weight of a photo-curable urethane acrylate (UNIDIC 17-824-9; manufactured by DIC Graphics Corporation) was applied in an application thickness of 15 g/m$^2$ to form a top coat layer 4 to obtain a decorated sheet of the present invention with a total thickness of 200 μm shown in FIG. 2.

With regard to the decorated sheets of samples No. 1 to 8 obtained by the above method, fire testing by a cone calorimeter testing machine, the measurement of haze value, the evaluation of surface hardness in a steel wool rubbing test and Hoffman scratch test, and the evaluation of post-processing resistance in a V-groove bending test were performed. The method of each evaluation test was conducted by a method described in the above Examples 13, 15 and 17. The obtained test results are shown in Table 11. Note that the explanation of symbols in Table 11 is as follows.

◉: Having very good transparency, abrasion resistance or post-processing resistance.

○: Having good transparency, abrasion resistance or post-processing resistance.

TABLE 11

| | Sample No. | 1 | 2 | 3 | 4 | 5 | 6 | 7 | 8 |
|---|---|---|---|---|---|---|---|---|---|
| Transparent resin layer | Haze value [%] | 12 | 12 | 13 | 13 | 12 | 12 | 13 | 13 |
| | Tensile elastic modulus [MPa] | 1000 | 1000 | 1000 | 1000 | 1000 | 1000 | 1000 | 1000 |
| | Tensile breaking elongation [%] | 250 | 250 | 200 | 200 | 250 | 250 | 200 | 200 |
| Top coat layer | Inorganic fine particles [parts by weight] | 0.1 | 30 | 0.1 | 30 | 0.1 | 30 | 0.1 | 30 |
| | Resin material species | Photo | Photo | Photo | Photo | Photo | Photo | Photo | Photo |
| | Haze value [%] | ○ (12) | ○ (13) | ○ (14) | ○ (14) | ○ (12) | ○ (13) | ○ (14) | ○ (14) |
| Primary film layer | Inorganic filler [parts by weight] | 500 | 500 | 500 | 500 | 500 | 500 | 500 | 500 |
| | Presence and absence of stretching | Absent | Absent | Absent | Absent | Present (fourfold) | Present (fourfold) | Present (fourfold) | Present (fourfold) |
| Evaluation results | Total heat release [MJ/m$^2$] | 6.4 | 6.5 | 6.6 | 6.6 | 5.3 | 5.3 | 5.4 | 5.3 |
| | Maximum heat release rate [kW/m$^2$] | 176 | 176 | 175 | 175 | 163 | 162 | 163 | 164 |
| | Total time over 200k [sec] | ○ | ○ | ○ | ○ | ○ | ○ | ○ | ○ |
| | Haze value [%] | ○ (12) | ○ (12) | ○ (13) | ○ (13) | ○ (12) | ○ (12) | ○ (13) | ○ (13) |

TABLE 11-continued

| Sample No. | 1 | 2 | 3 | 4 | 5 | 6 | 7 | 8 |
|---|---|---|---|---|---|---|---|---|
| Steel wool test | ○ | ⊙ | ○ | ⊙ | ○ | ⊙ | ○ | ⊙ |
| Hoffman scratch test | ⊙ | ○ | ⊙ | ○ | ⊙ | ○ | ⊙ | ○ |
| V-groove bending processability test | ⊙ | ○ | ⊙ | ○ | ⊙ | ○ | ⊙ | ○ |

As is apparent from Table 11, by making a decorated sheet comprising a transparent resin layer 1 that contains a nucleating agent vesicle and has a tensile elastic modulus of 1000 MPa and a tensile breaking elongation of 200 to 250%, and comprising a top coat layer 4 that contains a dispersant vesicle and 0.1 or 30 parts by weight of inorganic fine particles, and further comprising a primary film layer 7 that contains a dispersant vesicle and 500 parts by weight of an inorganic filler, the decorated sheet can be made a "noncombustible material" which satisfies the technical criteria of noncombustible materials defined in the Enforcement Order of Building Standards Law, while the decorated sheet has an excellent design due to a high transparency, and possesses excellent abrasion resistance and post-processing resistance.

Example 20

In Example 20, a decorated sheet of the embodiment 6 in the configuration of FIG. 2 was produced. Specifically, as in the combination shown in Table 12, the decorated sheet is a decorated sheet comprising a transparent resin layer 1 that contains a nucleating agent vesicle obtained by a supercritical reverse phase evaporation method or extrusion process, a top coat layer 4 that contains a dispersant vesicle obtained by a supercritical reverse phase evaporation method or extrusion process and inorganic fine particles, and a primary film layer 7 that contains a dispersant vesicle obtained by a supercritical reverse phase evaporation method or extrusion process and an inorganic filler. Note that, as a nucleating agent vesicle by a supercritical reverse phase evaporation method, one prepared in Example 13 was used, and as a nucleating agent vesicle by an extrusion process, one prepared in Example 14 was used. Also, as a dispersant vesicle by a supercritical reverse phase evaporation method, one prepared in Example 15 was used, and as a dispersant vesicle by an extrusion process, one prepared in Example 16 was used. As a dispersant, magnesium 12-hydroxystearate was used. As a photo-curable resin, a photo-curable urethane acrylate (UNIDIC 17-824-9; manufactured by DIC Graphics Corporation) was used. The decorated sheet was produced by a method explained in Example 19.

With regard to the decorated sheets of samples No. 9 to 11 obtained by the above method, fire testing by a cone calorimeter testing machine, the measurement of haze value, the evaluation of surface hardness in a steel wool rubbing test and Hoffman scratch test, and the evaluation of post-processing resistance in a V-groove bending test were performed. The method of each evaluation test was conducted by a method described in the above Examples 13, 15 and 17. The obtained test results are shown in Table 12. Note that the explanation of symbols in Table 12 is as follows.

○: Having good transparency, abrasion resistance or post-processing resistance.

TABLE 12

| | | Sample No. | | |
|---|---|---|---|---|
| | | 9 | 10 | 11 |
| Top coat layer | Vesiculation method | Extrusion process | Supercritical reverse phase evaporation method | Supercritical reverse phase evaporation method |
| | Haze value [%] | 13 | 12 | 12 |
| | Inorganic fine particles [parts by weight] | 30 | 30 | 30 |
| | Resin material species | Photo | Photo | Photo |
| Transparent resin layer | Vesiculation method | Supercritical reverse phase evaporation method | Extrusion process | Supercritical reverse phase evaporation method |
| | Haze value [%] | 13 | 14 | 13 |
| | Tensile elastic modulus [MPa] | 1000 | 1000 | 1000 |
| | Tensile breaking elongation [%] | 250 | 200 | 250 |
| Primary film layer | Vesiculation method | Supercritical reverse phase evaporation method | Supercritical reverse phase evaporation method | Extrusion process |
| | Inorganic filler [parts by weight] | 500 | 500 | 500 |

TABLE 12-continued

| | | Sample No. | | |
|---|---|---|---|---|
| | | 9 | 10 | 11 |
| Evaluation results | Presence and absence of stretching | Absent | Absent | Absent |
| | Total heat released [MJ/m$^2$] | 6.6 | 6.6 | 6.7 |
| | Maximum heat release rate [kW/m$^2$] | 176 | 176 | 176 |
| | Total time over 200 k [sec] | 0 | 0 | 0 |
| | Haze value [%] | ○ (13) | ○ (14) | ○ (12) |
| | Steel wool test | ○ | ○ | ○ |
| | Hoffman scratch test | ○ | ○ | ○ |
| | V-groove bending processability test | ○ | ○ | ○ |

As is apparent from Table 12, with regard to a plurality of resin layers, even in the case where the nucleating agent vesicle or dispersant vesicle obtained by different vesiculation methods were added, as a result, by making decorated sheets comprising a transparent resin layer 1 that contains a nucleating agent vesicle and has a tensile elastic modulus of 1000 MPa and a tensile breaking elongation of 200 to 250%, and comprising a top coat layer 4 that contains a dispersant vesicle and 30 parts by weight of inorganic fine particles, and further comprising a primary film layer 7 that contains a dispersant vesicle and 500 parts by weight of an inorganic filler, the decorated sheet can be made a "noncombustible material" which satisfies the technical criteria of noncombustible materials defined in the Enforcement Order of Building Standards Law, while the decorated sheet realizes high transparency of a haze value of 14% or less in a transparent layer consisting of a transparent resin layer 1 and a top coat layer 4 to have an excellent design, and possesses excellent abrasion resistance and post-processing resistance in decorated sheet surface.

Example 21

<Preparation of a Nucleating Agent Vesicle by an Extrusion Process>

A phospholipid suspension in which 100 parts by weight of distilled water, 0.7 parts by weight of a phosphoric acid ester metal salt based nucleating agent (Adekastab NA-11, manufactured by ADEKA Corporation) as a nucleating agent, and 0.05 parts by weight of phosphatidylcholine as a substance composing an outer membrane of a vesicle are mixed is placed into glass syringes, and the glass syringes are set to both sides of an extruder across a membrane filter with an arbitrary pore size. Under an arbitrary temperature of this extruder, the syringes in the glass syringes set to the both sides were alternately operated to pass through the membrane filter at an arbitrary number of times to obtain a nucleating agent vesicle comprising the nucleating agent and an outer membrane encapsulating the nucleating agent.

<Preparation of a Nucleating Agent Vesicle by a Supercritical Reverse Phase Evaporation Method>

100 parts by weight of methanol, 82 parts by weight of a phosphoric acid ester metal salt based nucleating agent (Adekastab NA-11, manufactured by ADEKA Corporation) as a nucleating agent, and 5 parts by weight of phosphatidylcholine as a substance composing an outer membrane of a vesicle are placed into a high pressure stainless vessel kept at 60° C. followed by tightly closing, and carbon dioxide is injected so as to achieve a pressure of 20 MPa for a supercritical state, and then, with vigorous stirring and mixing, 100 parts by weight of ion-exchanged water is injected. After stirring for 15 minutes in a state where the temperature and pressure in the vessel were held in the supercritical state, carbon dioxide was discharged to recover the atmospheric pressure to obtain a nucleating agent vesicle comprising the nucleating agent and an outer membrane of single-layer membrane consisting of a phospholipid within which the nucleating agent was encapsulated.

<Film-Forming of a Transparent Resin Sheet>

One example of the film-forming of a transparent resin sheet is shown. To a highly crystalline polypropylene resin having an isotactic pentad fraction of 97.8%, a melt flow rate (230° C.) of 15 g/10 min, and a molecular weight distribution MWD (Mw/Mn) of 2.3 are added 500 ppm of a hindered phenol based anti-oxidant (Irganox 1010: manufactured by BASF SE), 2000 ppm of a benzotriazole based ultraviolet absorbent (Tinuvin 328: manufactured by BASF SE), 2000 ppm of a hindered amine based light stabilizing agent (Chimassorb 944: manufactured by BASF SE), and 1000 ppm of the nucleating agent vesicle, and this resin is extrusion-molded to a transparent resin sheet with a thickness of 100 μm using a melt extruding machine. Note that, by the control of cooling conditions during extrusion film-forming, with regard to crystal parts of the crystalline polypropylene resin in the film-formed transparent resin sheet, 0, 5, 10 or 20% by weight of pseudohexagonal parts and 100, 95, 90 or 80% by weight of monoclinic parts can be provided, and the average particle size of spherulite in the crystal part of less than 5, 5, 10, 50, 100, 500, 1000, 1500, 2000 or 3000 nm can be provided.

<Average Particle Size of Spherulite>

The average particle size of spherulite in the transparent resin sheet can be calculated using the following equation based on intensity distribution of the scattered light measured by an Hv light-scattering process. In the measurement of the intensity distribution of the scattered light, the transparent resin sheet obtained by the above method is irradiated with laser light of a predetermined wavelength to detect the intensity distribution of the scattered light by a detector. A polarizer and an analyzer are set in front of and in rear of the point at which laser light of the transparent resin sheet go through, and the polarizing direction of the polarizer and the analyzer is set at a predetermined angle to obtain a profile to achieve a scattering intensity of I and a scattering angle of θ, and a predetermined scattering angle of θmax, and a maximum scattering intensity of Imax. From a value of this θmax, the size R of spherulite is calculated using the following equation.

$$4.09 = 4\pi(R/\lambda)\sin(\theta max/2)$$

Also, the compositional ratio of pseudohexagonal parts and monoclinic parts in the crystal parts of the transparent resin sheet can be calculated form an X-ray diffraction profile obtained by an X-ray diffraction apparatus. In a specific method, X-ray source is fixed at 0.5° to a film surface, and a detector scans from 3° to 35° at a scan speed of 4°/min to obtain an X-ray diffraction profile. From the resulting X-ray diffraction profile, profile fitting is performed to extract the peaks derived from pseudohexagonal crystals and monoclinic crystals to calculate the constituent ratio of the pseudohexagonal parts and the monoclinic parts by the area ratio of the peaks.

<Production of a Decorated Sheet>

In Example 21, as a the above transparent resin sheet, a decorated sheet comprising a transparent resin sheet that contains a nucleating agent vesicle and that is produced by use of a highly crystalline polypropylene resin having a melt flow rate (230° C.) of 3, 5, 10, 30 or 40 g/10 min was made. Note that, with regard to the transparent resin sheet, the presence ratio of pseudohexagonal parts and monoclinic parts in the crystal parts is considered to be 20% by weight of pseudohexagonal parts, and 80% by weight of monoclinic parts. A production method of a specific decorated sheet is explained hereinbelow.

Also, as a comparative example in comparison to the present Example, a highly crystalline polypropylene resin having a melt flow rate (230° C.) of 2 or 50 g/10 min was used to produce a decorated sheet comprising a transparent resin sheet that contains a nucleating agent vesicle and that is film-formed with the average particle size of spherulite of less than 5, 5, 10, 50, 100, 500, 1000, 1500, 2000 or 3000 nm.

Both surfaces of the transparent resin sheet with a thickness of 100 μm obtained by the above film-forming method underwent corona treatment to achieve a wetting tension on the surfaces of 40 dyn/cm or more. To one surface of the substrate sheet as a primary film layer 7 with a thickness of 70 μm possessing concealing properties, a pattern printing was carried out by a two-component curable type urethane ink (V180: manufactured by TOYO Ink Manufacturing Co., Ltd.) to form a pattern layer 2, and also, the other surface of the substrate sheet was provided with a primer coat to form a primer layer 5. After this, a surface of the pattern layer 2 on the substrate sheet was laminated with the transparent resin sheet via an adhesive layer 6 based on an adhesive for dry lamination (TAKELAC A540; manufactured by Mitsui Chemicals, Inc.; amount applied of 2 g/m²) by a dry lamination process. Next, a surface of the transparent resin sheet was press-worked using a metal mold roll for embossment to form an emboss design 1a, and then, on that emboss design 1a surface, a two-component curable type urethane top coat (W184: manufactured by DIC Graphics Corporation) was applied in an amount applied of 3 g/m² to form a top coat layer 4 to obtain a decorated sheet 10 with a total thickness of 200 μm. With regard to each decorated sheet 10, a V-groove bending processability test was performed to evaluate the superiority and inferiority of post-processing resistance.

In a V-groove bending processability test, each decorated sheet 10 obtained by the above method is affixed onto one surface of a medium density fiberboard (MDF) as a substrate B using a urethane based adhesive, and, so as not to create flaws on the opposite decorated sheet 10, the other surface of the substrate B is provided with a V-shaped groove reaching to the boundary at which the substrate B is laminated with the decorated sheet 10. Next, the substrate B is folded along the V-shaped groove to 90 degrees so as to mountain-fold a surface of the decorated sheet 10, and an optical microscope is used to observe whether or not whitening or cracking and the like are formed on the folded part of the surface of the decorated sheet 10 to conduct the evaluation of the superiority and inferiority of post-processing resistance. The obtained evaluation results are shown in Table 13. Note that the explanation of symbols in Table 13 is as follows.

⊚: Having very good transparency, abrasion resistance or post-processing resistance.

○: Having good transparency, abrasion resistance or post-processing resistance.

X: Poor transparency, abrasion resistance or post-processing resistance.

TABLE 13

| MFR (g/10 min) | Spherulite size (nm) | | | | | | | | | |
|---|---|---|---|---|---|---|---|---|---|---|
| | Less than 5 | 5 | 10 | 50 | 100 | 500 | 1000 | 1500 | 2000 | 3000 |
| In the case where a nucleating agent vesicle obtained by an extrusion process was blended | | | | | | | | | | |
| 2 | X | X | X | X | X | X | X | X | X | X |
| 3 | ○ | ○ | ○ | ○ | ○ | ○ | ○ | ○ | ○ | X |
| 5 | ○ | ○ | ○ | ○ | ○ | ○ | ○ | ○ | ○ | X |
| 10 | ○ | ○ | ○ | ⊚ | ⊚ | ⊚ | ⊚ | ⊚ | ○ | X |
| 30 | ○ | ○ | ○ | ⊚ | ⊚ | ⊚ | ⊚ | ⊚ | ○ | X |
| 40 | ○ | ○ | ○ | ○ | ○ | ○ | ○ | ○ | ○ | X |
| 50 | X | X | X | X | X | X | X | X | X | X |
| In the case where a nucleating agent vesicle obtained by a supercritical reverse phase evaporation method was blended | | | | | | | | | | |
| 2 | X | X | X | X | X | X | X | X | X | X |
| 3 | ○ | ○ | ○ | ○ | ○ | ○ | ○ | ○ | ○ | X |
| 5 | ○ | ○ | ⊚ | ⊚ | ⊚ | ⊚ | ⊚ | ⊚ | ○ | X |
| 10 | ○ | ○ | ⊚ | ⊚ | ⊚ | ⊚ | ⊚ | ⊚ | ○ | X |
| 30 | ○ | ○ | ⊚ | ⊚ | ⊚ | ⊚ | ⊚ | ⊚ | ○ | X |
| 40 | ○ | ○ | ⊚ | ⊚ | ⊚ | ⊚ | ⊚ | ○ | ○ | X |
| 50 | X | X | X | X | X | X | X | X | X | X |

As is apparent from Table 13, also in the case where the nucleating agent vesicle prepared using any of the vesiculation methods was blended, it can be said that the decorated sheet 10 of Example 21 comprising a transparent resin sheet in which the average particle size of spherulite of 2000 nm or less was achieved using a crystalline polypropylene resin having a melt flow rate of 3 to 40 g/10 min has an excellent post-processing resistance in comparison to decorated sheets produced as comparative examples. Here, the measurement method for the average particle size of spherulite using an Hv light-scattering process employed in the present Example has a measurable lower limit value of 5 nm for a precise measurement, and therefore, the samples with the measured average particle size of 5 nm or less are expressed as less than 5 nm. Then, as is shown in Table 13, it is found that a decorated sheet 10 comprising a transparent resin sheet with the average particle size of spherulite of less than 5 nm also possesses an excellent post-processing resistance. Note that, in the case where a nucleating agent without vesiculation was used, a transparent resin sheet with the average particle size of spherulite of 2000 nm or less was unable to be film-formed.

Example 22

In Example 22, as the above transparent resin sheet, a decorated sheet 10 was made which was film-formed with the compositional ratio of the pseudohexagonal parts and the monoclinic parts in the crystal parts of the crystalline polypropylene resin in which pseudohexagonal parts were 0, 5, 10 and 20% by weight, and monoclinic parts were 100, 95, 90 and 80% by weight, and the average particle size of spherulite of less than 5, 5, 10, 50, 100, 500, 1000, 1500 or 2000 nm. Note that the decorated sheet 10 was produced by a similar method to Example 21. With regard to each of the resulting decorated sheets 10, the evaluation of surface hardness in a Hoffman scratch test and steel wool rubbing test was performed.

Also, as a comparative example in comparison to the present Example, a decorated sheet 10 comprising a transparent resin sheet film-formed with the compositional ratio of the pseudohexagonal parts and the monoclinic parts in the crystal parts of the crystalline polypropylene resin in which pseudohexagonal parts were 0, 5, 10 and 20% by weight, and monoclinic parts were 100, 95, 90 and 80% by weight, and the average particle size of spherulite of 3000 nm was produced.

The test method in each evaluation test is briefly explained.

<Hoffman Scratch Test>

In a Hoffman scratch test, a Hoffman scratch hardness tester (manufactured by BYK-Gardner) was used to scratch a surface of each decorated sheet 10 laminated with a wooden substrate at a constant speed with a load of 1200 g to determine the presence or absence of the damage on the surface of the decorated sheet 10 visually.

<Steel Wool Rubbing Test>

In a steel wool rubbing test, a jig was used for fixing in a state where a steel wool abutted a surface of each decorated sheet 10 laminated with a wooden base material, and with a load of 500 g imposed to the jig, the surface was rubbed under the conditions of a constant speed, a distance of 50 mm, and shuttles of 50 times to determine the presence or absence of the damage on the surface of the decorated sheet 10 visually. As a steel wool, Bonstar #0 (manufactured by NIPPON STEEL WOOL CO., LTD.) was rounded and used.

The obtained results of Hoffman scratch test are shown in Table 14, and the results of steel wool rubbing test are shown in Table 15. Note that the explanation of symbols in Table 14 and Table 15 is as follows.

◎: Having very good transparency, abrasion resistance or post-processing resistance.

○: Having good transparency, abrasion resistance or post-processing resistance.

X: Poor transparency, abrasion resistance or post-processing resistance.

TABLE 14

| Crystal part (% by weight) | | Spherulite size (nm) | | | | | | | | | |
|---|---|---|---|---|---|---|---|---|---|---|---|
| Pseudohexagonal Part | Monoclinic part | Less than 5 | 5 | 10 | 50 | 100 | 500 | 1000 | 1500 | 2000 | 3000 |
| In the case where a nucleating agent vesicle obtained by an extrusion process was blended | | | | | | | | | | | |
| 0 | 100 | ○ | ○ | ◎ | ◎ | ◎ | ◎ | ◎ | ◎ | ○ | X |
| 5 | 95 | ○ | ○ | ◎ | ◎ | ◎ | ◎ | ◎ | ○ | ○ | X |
| 10 | 90 | ○ | ○ | ◎ | ◎ | ◎ | ◎ | ○ | ○ | ○ | X |
| 20 | 80 | ○ | ○ | ◎ | ◎ | ◎ | ○ | ○ | ○ | ○ | X |
| 30 | 70 | | | | | Production unable | | | | | |
| 50 | 50 | | | | | | | | | | |
| 80 | 20 | | | | | | | | | | |
| 90 | 10 | | | | | | | | | | |
| In the case where a nucleating agent vesicle obtained by a supercritical reverse phase evaporation method was blended | | | | | | | | | | | |
| 0 | 100 | ○ | ○ | ◎ | ◎ | ◎ | ◎ | ◎ | ◎ | ◎ | X |
| 5 | 95 | ○ | ○ | ◎ | ◎ | ◎ | ◎ | ◎ | ◎ | ○ | X |
| 10 | 90 | ○ | ○ | ◎ | ◎ | ◎ | ◎ | ◎ | ○ | ○ | X |
| 20 | 80 | ○ | ○ | ◎ | ◎ | ◎ | ◎ | ◎ | ○ | ○ | X |
| 30 | 70 | | | | | Production unable | | | | | |
| 50 | 50 | | | | | | | | | | |
| 80 | 20 | | | | | | | | | | |
| 90 | 10 | | | | | | | | | | |

TABLE 15

| Crystal part (% by weight) | | Spherulite size (nm) | | | | | | | | | |
|---|---|---|---|---|---|---|---|---|---|---|---|
| Pseudohexagonal part | Monoclinic Part | Less than 5 | 5 | 10 | 50 | 100 | 500 | 1000 | 1500 | 2000 | 3000 |
| In the case where a nucleating agent vesicle obtained by an extrusion process was blended | | | | | | | | | | | |
| 0 | 100 | ○ | ○ | ◎ | ◎ | ◎ | ◎ | ◎ | ◎ | ○ | X |
| 5 | 95 | ○ | ○ | ◎ | ◎ | ◎ | ◎ | ◎ | ○ | ○ | X |
| 10 | 90 | ○ | ○ | ◎ | ◎ | ◎ | ◎ | ○ | ○ | ○ | X |
| 20 | 80 | ○ | ○ | ◎ | ◎ | ◎ | ○ | ○ | ○ | ○ | X |
| 30 | 70 | | | | | Production unable | | | | | |
| 50 | 50 | | | | | | | | | | |

TABLE 15-continued

| Crystal part (% by weight) | | Spherulite size (nm) | | | | | | | | | |
|---|---|---|---|---|---|---|---|---|---|---|---|
| Pseudohexagonal part | Monoclinic Part | Less than 5 | 5 | 10 | 50 | 100 | 500 | 1000 | 1500 | 2000 | 3000 |
| 80 | 20 | | | | | | | | | | |
| 90 | 10 | | | | | | | | | | |
| In the case where a nucleating agent vesicle obtained by a supercritical reverse phase evaporation method was blended | | | | | | | | | | | |
| 0 | 100 | ○ | ○ | ◎ | ◎ | ◎ | ◎ | ◎ | ◎ | ◎ | X |
| 5 | 95 | ○ | ○ | ◎ | ◎ | ◎ | ◎ | ◎ | ○ | ○ | X |
| 10 | 90 | ○ | ○ | ◎ | ◎ | ◎ | ◎ | ◎ | ○ | ○ | X |
| 20 | 80 | ○ | ○ | ◎ | ◎ | ◎ | ◎ | ◎ | ○ | ○ | X |
| 30 | 70 | | | | | Production unable | | | | | |
| 50 | 50 | | | | | | | | | | |
| 80 | 20 | | | | | | | | | | |
| 90 | 10 | | | | | | | | | | |

As is apparent from Table 14 and Table 15, also in the case where the nucleating agent vesicle prepared using any of the vesiculation methods was blended, it can be said that a decorated sheet 10 comprising a transparent resin sheet with the average particle size of spherulite in a range of 2000 nm or less has an excellent abrasion resistance. Note that, in the case where a nucleating agent without vesiculation was used, a transparent resin sheet with the average particle size of spherulite of 2000 nm or less was unable to be film-formed.

The decorated sheet of the present invention is not limited to the above embodiments and Examples, and various modifications can be made within a range which does not deteriorate the features of the present invention.

REFERENCE SIGNS LIST

1 . . . Transparent resin layer, 1a . . . Emboss design, 2 . . . Pattern layer, 3 . . . Concealing layer, 4 . . . Top coat layer, 5 . . . Primer layer, 6 . . . Adhesive layer, 7 . . . Primary film layer, 8 . . . Adherable resin layer, 10 . . . Decorated sheet.

The invention claimed is:

1. A decorative sheet comprising:
a primary film layer;
a top coat layer; and
a transparent resin layer in between the primary film layer and the top coat layer,
  wherein the transparent resin layer comprises:
    a first group of vesicles encapsulating only a nucleating agent, as a nano-sized additive, and
    a crystalline polypropylene resin comprising 90% or more and less than 100%, by weight of the transparent resin layer,
  wherein the primary film layer comprises:
    dispersants as a nano-sized additive, and
    an inorganic filler,
  wherein the dispersants are vesicles other than the first group of vesicles, and
  wherein the primary film layer is in a state where the inorganic filler is blended in a proportion of 50 to 900 parts by weight based on 100 parts by weight of a polyolefin resin being a main component of the primary film layer.

2. The decorative sheet according to claim 1, wherein a vesicle from among the first group of vesicles has an outer membrane, the outer membrane being a single-layer membrane.

3. The decorative sheet according to claim 2, wherein the outer membrane comprising a phospholipid.

4. The decorative sheet according to claim 1 wherein a haze value of the transparent resin layer is 15% or less.

5. The decorative sheet according to claim 1, wherein the transparent resin layer has a tensile elastic modulus of 800 MPa or more and 2000 MPa or less and a tensile breaking elongation of 200% or more.

6. The decorative sheet according to claim 1, wherein the crystalline polypropylene resin is a highly crystalline polypropylene resin having an isotactic pentad fraction (mmmm fraction) of 95% or more.

7. The decorative sheet according to claim 1, wherein the transparent resin layer has a thickness of 20 μm or more and 250 μm or less.

8. The decorative sheet according to claim 1, wherein the dispersant is at least one of a polymeric surfactant, a fatty acid metal salt, a silane coupling agent, a titanate coupling agent, silicone, wax, and a modified resin.

9. The decorative sheet according to claim 1, wherein the inorganic filler comprises calcium carbonate.

10. The decorative sheet according to claim 1, wherein the primary film layer consists of a uniaxially stretched sheet or a biaxially stretched sheet.

11. The decorative sheet according to claim 1, wherein the decorative sheet when in a state of being laminated with a noncombustible substrate is a noncombustible material satisfying requirements set forth in Article 108bis(1) and (2) of the Enforcement Order of the Building Standard Law in fire testing by a corn calorimeter in accordance with ISO 5660-1.

12. The decorative sheet according to claim 2, wherein the outer membrane of the vesicle partially collapses and arrives at a state where the nucleating agent is exposed.

* * * * *

UNITED STATES PATENT AND TRADEMARK OFFICE
CERTIFICATE OF CORRECTION

PATENT NO. : 10,981,364 B2
APPLICATION NO. : 15/525865
DATED : April 20, 2021
INVENTOR(S) : Ikeda et al.

Page 1 of 1

It is certified that error appears in the above-identified patent and that said Letters Patent is hereby corrected as shown below:

In the Specification

Column 1, Line 2, below title section "DECORATED SHEET" insert section with section heading of:
-- CROSS-REFERENCE TO RELATED APPLICATIONS
This application is a U.S. National Stage Application, which claims the benefit under 35 U.S.C. §371 of PCT International Patent Application No. PCT/JP2015/081745, filed Nov. 11, 2015 which claims the foreign priority benefit under 35 U.S.C. §119 of Japanese Patent Application Nos. 2015-045763, 2014-256197, 2014-228857, 2014-228856, filed Mar. 9, 2015, Dec. 18, 2014, Nov. 11, 2014, and Nov. 11, 2014, respectively, the contents of which are incorporated herein by reference. --.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*